United States Patent [19]
Yamamoto et al.

[11] Patent Number: 5,717,506
[45] Date of Patent: Feb. 10, 1998

[54] IMAGE COMMUNICATION APPARATUS FOR COMMUNICATING BINARY AND MULTI-VALUE COLOR IMAGE DATA

[75] Inventors: Masakuni Yamamoto, Yamato; Kiyonobu Endo, Yokohama; Susumu Matsumura, Kawaguchi; Hiroaki Hoshi, Yokohama; Koyo Hasegawa, Tokyo; Eiji Yamaguchi, Zama; Ichiro Iida, Tokyo; Hideki Morishima, Atsugi, all of Japan

[73] Assignee: Canon Kabushiki Kaisha, Japan

[21] Appl. No.: 401,282

[22] Filed: Mar. 9, 1995

Related U.S. Application Data

[63] Continuation of Ser. No. 868,019, Apr. 13, 1992, abandoned.

[30] Foreign Application Priority Data

| Apr. 15, 1991 | [JP] | Japan | 3-082144 |
| Apr. 15, 1991 | [JP] | Japan | 3-082145 |
| Apr. 25, 1991 | [JP] | Japan | 3-095511 |

[51] Int. Cl.$^6$ ............................................. H04N 1/46
[52] U.S. Cl. ............................. 358/523; 358/500
[58] Field of Search ........................... 358/500, 501, 358/505, 508, 534, 538, 539, 400, 403, 524, 462, 523; 382/165, 167; 395/131–132, 164; H04N 1/46

[56] References Cited

U.S. PATENT DOCUMENTS

| 4,713,684 | 12/1987 | Kawamura et al. | 358/515 |
| 4,819,063 | 4/1989 | Sugiura et al. | 358/75 |
| 4,827,349 | 5/1989 | Ogata et al. | 358/256 |
| 4,862,254 | 8/1989 | Takada | 358/515 |
| 4,900,902 | 2/1990 | Sakakibara | 235/375 |
| 4,922,349 | 5/1990 | Abe et al. | 358/443 |
| 5,081,527 | 1/1992 | Naito | 358/518 |
| 5,111,306 | 5/1992 | Kano et al. | 358/426 |
| 5,128,748 | 7/1992 | Murakami et al. | 358/518 |
| 5,220,417 | 6/1993 | Sugiura . | |
| 5,227,893 | 7/1993 | Ett | 358/426 |
| 5,361,143 | 11/1994 | Nakayama et al. | 358/500 |
| 5,361,144 | 11/1994 | Sugiura | 358/500 |
| 5,363,219 | 11/1994 | Yoshida | 358/539 |
| 5,489,998 | 2/1996 | Yamada et al. | 358/523 |

*Primary Examiner*—Kim Vu
*Attorney, Agent, or Firm*—Fitzpatrick, Cella, Harper & Scinto

[57] ABSTRACT

A magneto-optical disk according to the present invention has a transmission directory and a reception directory. An image to be transmitted is stored under the transmission directory as a single file, while a received image is stored under the reception directory as a single file. The operator designates a desired file stored under each of the directories for printing or transmission.

19 Claims, 37 Drawing Sheets

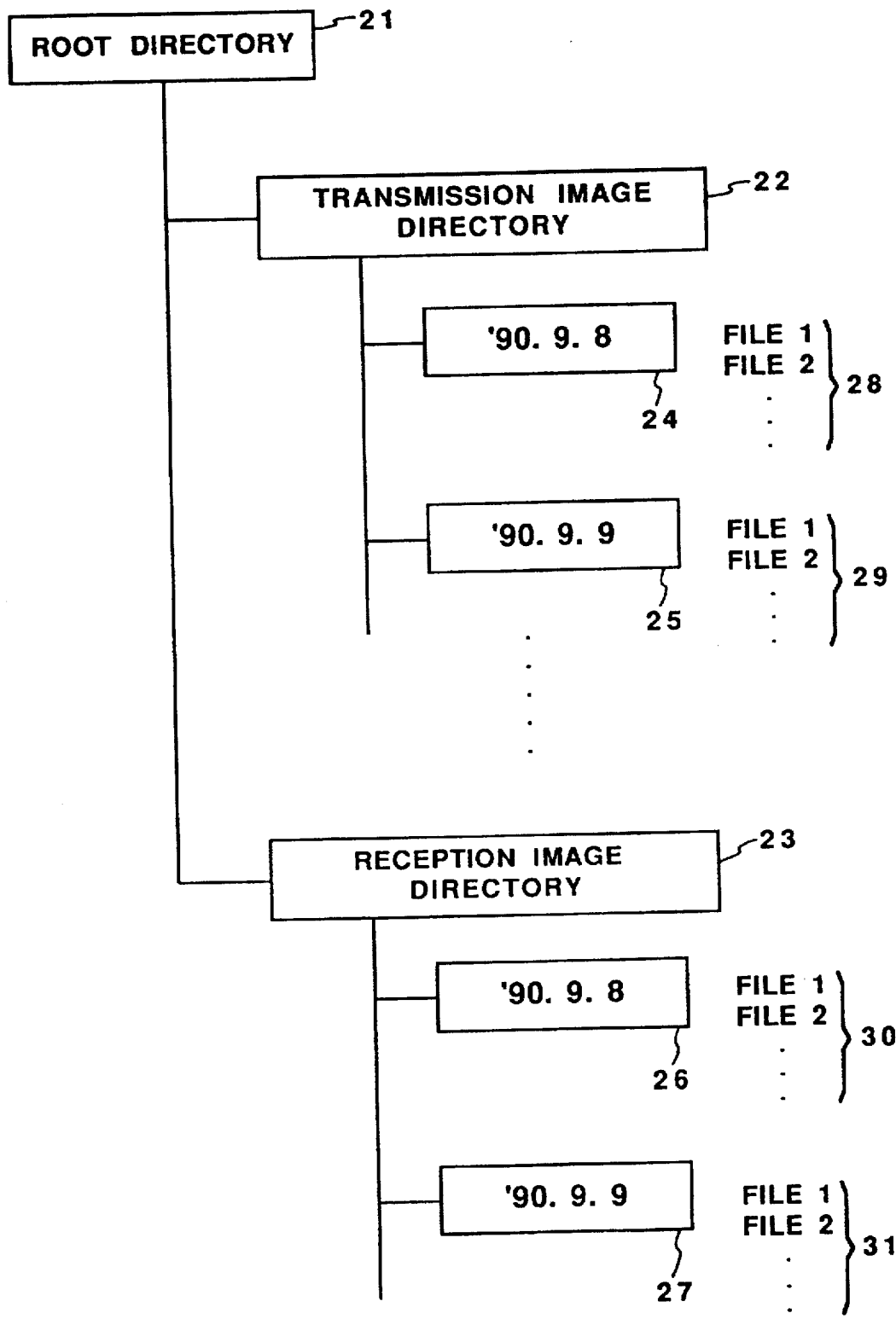
F I G. 4

WHICH OPERATION WILL BE PERFORMED?

① INPUT OF IMAGE FROM THE SCANNER

② TRANSMISSION OF IMAGE FROM THE FACSIMILE APPARATUS

③ RECEPTION OF IMAGE BY THE FACSIMILE APPARATUS

④ OUTPUT OF IMAGE FROM THE PRINTER

SELECT THE NUMBER

FIG. 7

NAME OF DIRECTORY     X Y Z

①   A B C   TO   X Y Z     '90. 9. 8,   9 : 30

②   X Y Z   TO   A B C     '90. 9. 8, 15 : 00

③

INPUT THE FILE NUMBER TO BE TRANSMITTED

FIG. 8

| NAME OF DIRECTORY | POSITION/SIZE | IMAGE |
|---|---|---|
| X Y Z | $X_1$, $S_1$ | ☎ 000 - 111 - ····· |
| ～～～ | ～～～ | ～～～ |
| E O F | | |

F I G. 10

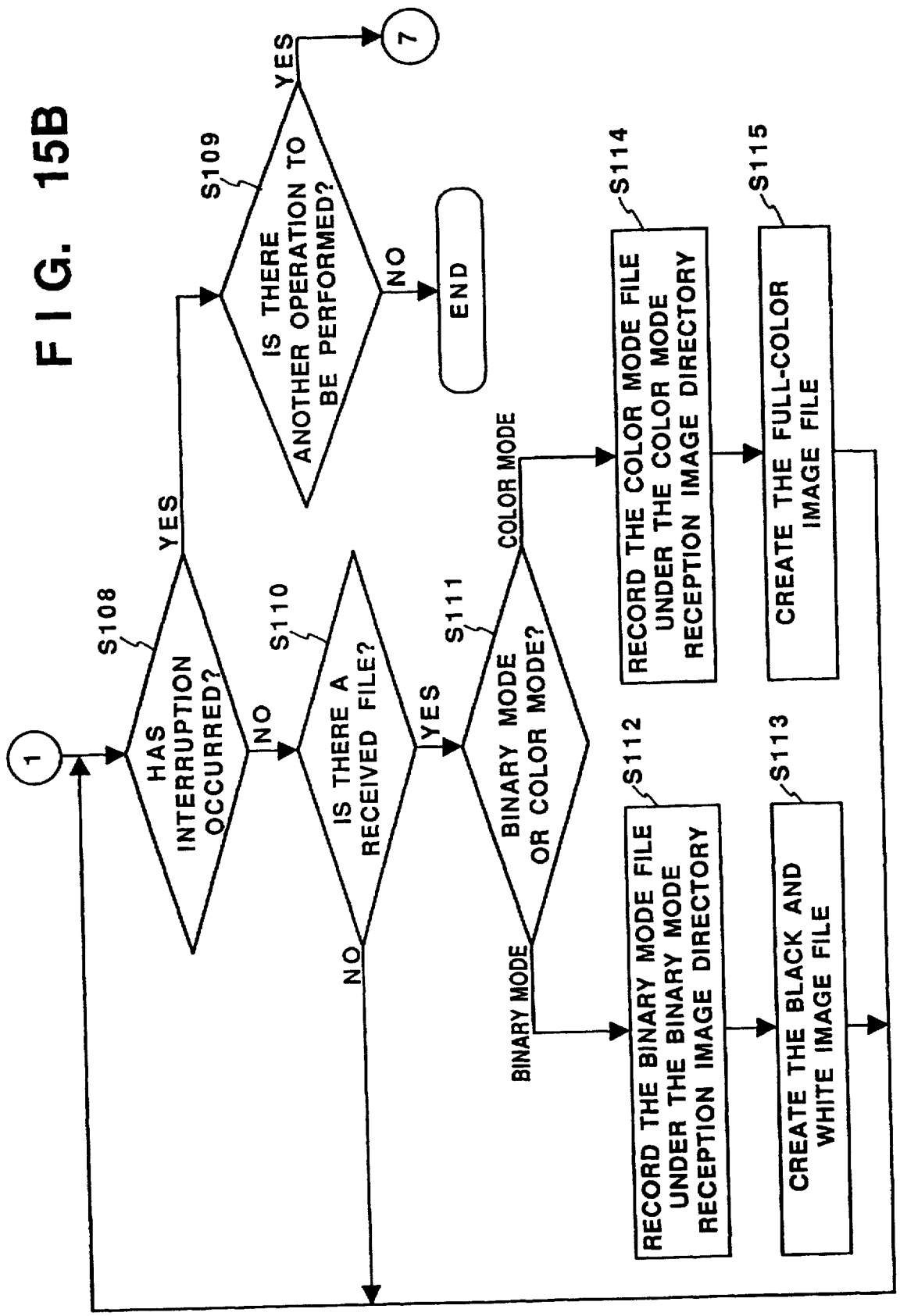

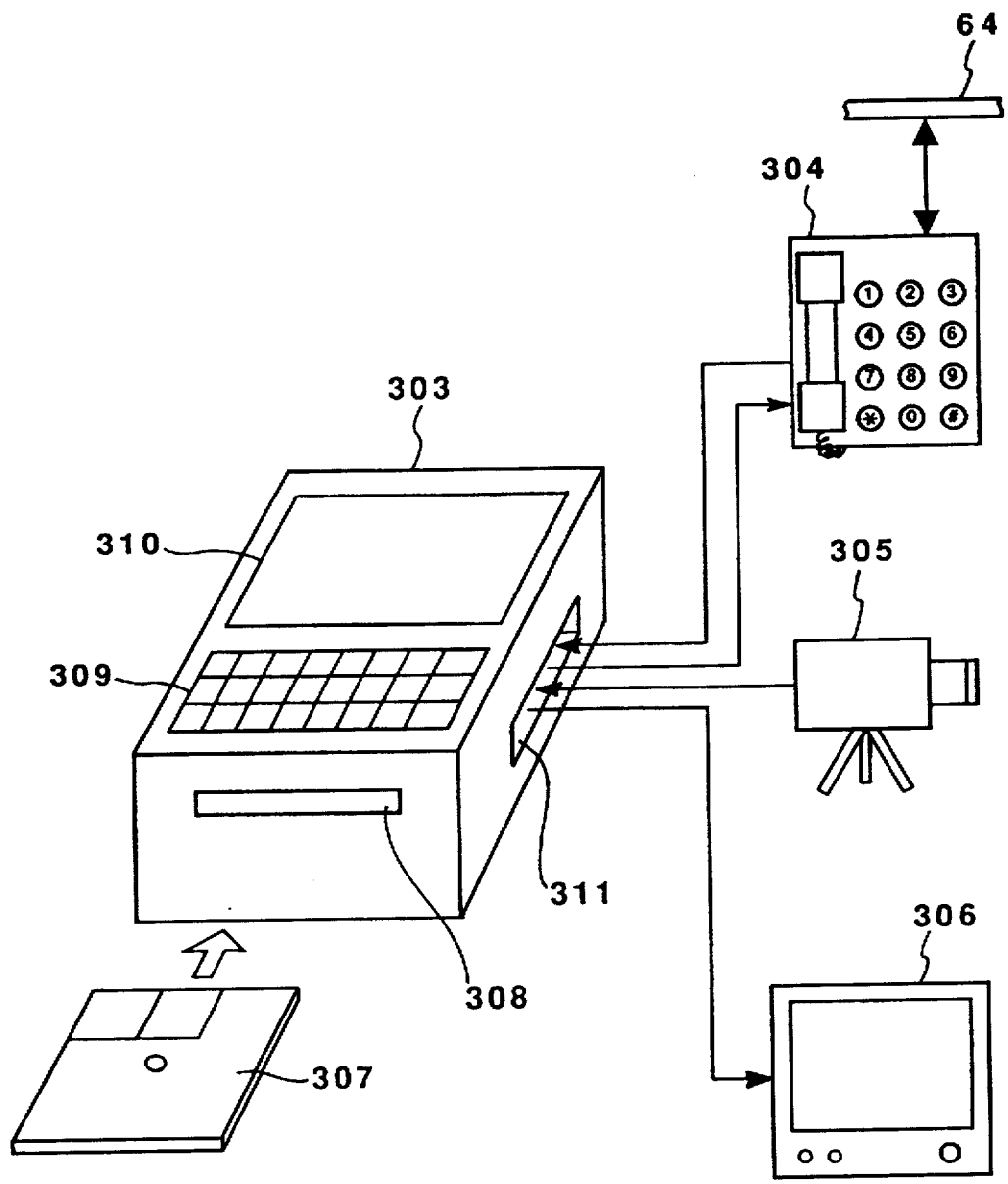
F I G. 19

IMAGE COMMUNICATION APPARATUS FOR COMMUNICATING BINARY AND MULTI-VALUE COLOR IMAGE DATA

This application is a continuation of application Ser. No. 07/868,019 filed Apr. 13, 1992 ABN.

BACKGROUND OF THE INVENTION

The present invention relates to an image communication apparatus, and more particularly, to an image communication apparatus, such as a facsimile machine, which performs transmission and reception of images with remote parties through a communication line.

FIG. 9 is a block diagram of a conventional facsimile machine.

In FIG. 9, reference numeral 63 denotes a facsimile machine body which performs transmission and reception of images or voices through a telephone line interface 64 with a remote machine connected to a telephone line 64; 66, a telephone set which performs transmission and reception of voices when connected to the telephone line 64; and 67 through 72, a facsimile unit for performing transmission and reception of images.

When an image is to be transmitted, a receiver's telephone number is first called by the telephone set 66. When the facsimile machine is connected to the receiver's facsimile machine through the telephone line 64, the scanner unit 67 reads an image and sends it as a binary signal to the encoding circuit 68 which processes image compression or the like on the image signal. The resultant image signal is sent to the modulation/demodulation circuit 70 through the transmission/reception switch-over circuit 69, and the modulated signal is transmitted to the remote machine through the telephone line interface 65 and the telephone line 64.

When an image is to be received, a call reaches from the remote machine. When the facsimile machine is connected to the telephone line 64, a modulated signal arrives. The received signal is sent through the telephone line interface 64 to the modulation/demodulation circuit 70 which demodulates it. The demodulated digital signal is input to the decoding circuit 71 through the transmission/reception switch-over circuit 69 and is restored to an original signal. The restored binary signal is sent to the printer unit 72 which outputs it as a visible image on the recording paper.

A fixed magnetic disk device may be incorporated in the facsimile machine body to temporarily store images to be transmitted or which are received.

The aforementioned conventional facsimile machine has drawbacks in that an image to be input must be the one recorded on a sheet of paper of a fixed size and in that an image to be output must be recorded on a sheet of paper of a fixed size.

Furthermore, the scanner unit 67 can read only the originals that can be conveyed along the scanner unit 67. Therefore, the bound thick documents, such as a book, or the sheets of paper larger than the specified size cannot be read by the scanner unit unless they are copied on sheets of paper having a size which can be used in the scanner unit.

Furthermore, recording paper having a predetermined size is required to output received facsimile images. This makes the operation of the facsimile machine expensive.

In the aforementioned conventional facsimile machine in which the fixed magnetic disk memory is incorporated, since images are stored in the memory temporarily, they can be stored permanently only when they are output on the recording paper. Storage of the recording paper requires large space.

In the facsimile machine in which the fixed magnetic disk device is incorporated to temporarily store images, since the images are stored in any area, retrieval of the images is difficult.

SUMMARY OF THE INVENTION

It is an object of the present invention to provide an image communication apparatus which is capable of facilitating management of images which are exchanged in communications.

To achieve the above object, the present invention provides an image communication apparatus for performing transmission and reception of an image with a remote terminal via a communication line, which comprises storage means for storing as a named file an image to be transmitted or a received image in a data storage medium which can be loaded and unloaded, designation means for designating one of the plurality of images stored by the storage means, transmission means for transmitting the image designated by the designation means to a desired remote terminal, and output means for printing out the image designated by the designation means.

It is another object of the present invention to provide an image communication apparatus which is capable of facilitating management of a binary image and a color image which are to be transmitted.

To achieve the above object, the present invention provides an image communication apparatus for performing transmission and reception of an image with a remote terminal via a communication line, which comprises data storage medium for storing data, the medium being able to be loaded and unloaded, first reading means for reading an original document image as a binary image, second reading means for reading an original document image as a color image, storage means for storing the image read by either the first or second reading means in the data storage medium as a named file, designation means for designating one of the plurality of images stored by the storage means, and transmission means for transmitting the image designated by the designation means.

It is another object of the present invention is to provide an image communication apparatus which is capable of facilitating management of images to be transmitted and which is capable of transmitting a binary image when it is clarified at the stage of transmission that a remote terminal cannot receive color images.

To achieve the above object, the present invention provides an image communication apparatus for transmitting a binary image and a color image to a remote terminal via a communication line, which comprises data storage medium for storing data, the medium being able to be loaded and unloaded, reading means for reading an original document image as color image data, image generation means for generating binary image type data corresponding to the color image data read by the reading means, storage means for storing the color image data read by the reading means and the binary image data generated by the image generation means in a related manner in the data storage medium, designation means for designating one of the plurality of images stored in the data storage medium, determination means for determining whether or not the remote terminal has a color image reception function, and transmission means for transmitting either the binary image data or the color image data which are related to the image designated by the designation means according to the function of the remote terminal which is determined by the determination means.

It is another object of the present invention to provide an image communication apparatus which is capable of facilitating received images, and which is capable of printing out the received images in a binary printer or a color printer regardless of the type of the received image.

To achieve the above object, the present invention provides an image communication apparatus for receiving a binary image and a color image from a remote terminal via a communication line, which comprises data storage medium for storing data, the medium being able to be loaded and unloaded, first printing means for printing the binary image, second printing means for printing the color image, first image generation means for generating color image type data corresponding to the binary image which is the received image, second image generation means for generating binary image type data corresponding to the color image which is the received image, and storage means for storing the received image and the image corresponding to the received image and generated by the first or second image generation means in the data storage medium as files. A desired binary image in the plurality of images stored in the data storage medium is printed by the first printing means, and a desired color image in the plurality of images stored in the data storage medium is printed by the second printing means.

It is another object of the present invention to provide an image communication apparatus which is capable of facilitating management of files, and which is capable of displaying and thereby checking data corresponding to a received image before the received image is printed out.

To achieve the above object, the present invention provides an image communication apparatus for receiving a binary image and a color image from a remote terminal via a communication line, which comprises data storage medium for storing data, the medium being able to be loaded and unloaded, display means for displaying images, first video signal generation means for generating video data corresponding to the binary image which is the received image, the video data having a size corresponding to a display size of the display means, and second video signal generation means for generating video data corresponding to the color image which is the received image, the video data having a size corresponding to the display size of the display means. The display means displays an image based on the video data generated by the first or second video signal generation means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 illustrates a directory of a magneto-optical disk in the first embodiment;

FIG. 7 illustrates an example of a displayed message which is related to selection of processing items in the first embodiment;

FIG. 8 illustrates an example of a directory display in the first embodiment;

FIG. 10 illustrates the contents of an originator table in the first embodiment;

FIGS. 15A to 15G are flowcharts showing the operation contents of the facsimile apparatus in the second embodiment;

FIG. 19 is an external view of a separation type facsimile apparatus in the third embodiment;

DETAILED DESCRIPTION OF THE PREFERRED EMBODIMENTS

Embodiments of the present invention will now be described below with reference to the accompanying drawings.

Figure 1:
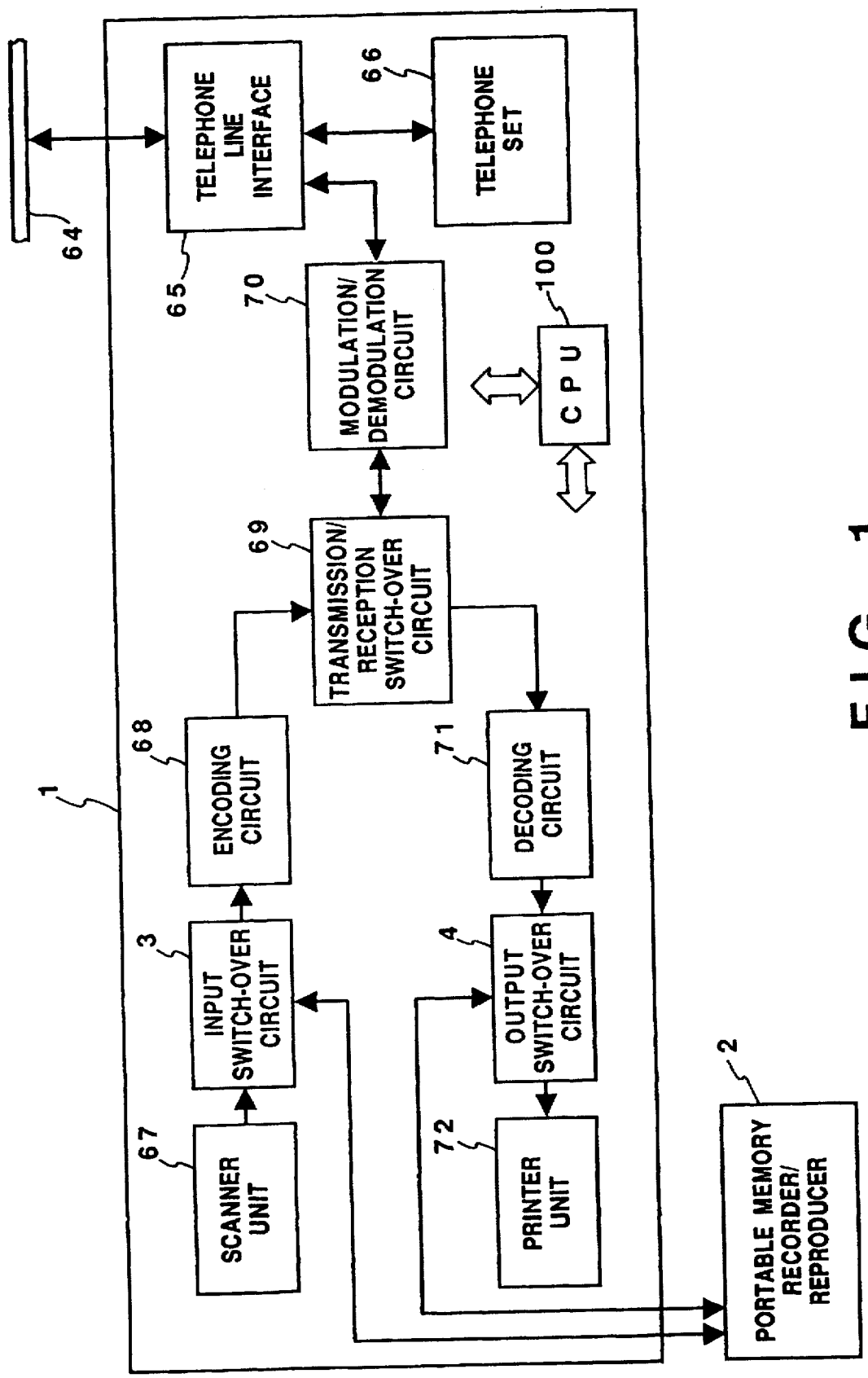
FIG. 1 is a diagrammatic view of a facsimile apparatus according to first and second embodiments of the present invention.

FIG. 1 is a block diagram of a first embodiment of a facsimile apparatus according to the present invention.

In FIG. 1, reference character 1 denotes a facsimile apparatus body. Reference characters 64 through 72 denote parts having the same functions as those of the parts designated by the same reference characters in FIG. 9. Reference character 2 denotes a recorder/reproducer for a portable storage medium which is connected to the facsimile apparatus body 1. In this embodiment, a magneto-optical disk is used as the portable storage medium. A floppy disk or a removable hard disk may also be employed. However, a magneto optic disk is desirable in terms of the storage capacity and cost. In the case of a 600 M byte magneto-optical disk, it is possible to store facsimile image of about 1200 pages.

An input switch-over circuit 3 switches over the objects to which an image signal is input. That is, the input switch-over circuit 3 switches over the flow of the signal in the following three cases: the first one in which the binary signal of an image for transmission which is read by the scanner unit 67 is fed to the encoding circuit 68 for facsimile transmission which is conducted in the same manner as that of the conventional facsimile machine, the second one in which the binary signal is fed from the scanner unit 67 to the portable memory recorder/reproducer 2 to record it in the portable memory medium set in the portable memory recorder/reproducer 2 as a facsimile image file, and the third one in which the facsimile image file reproduced by the portable memory recorder/reproducer 2 is fed to the encoding circuit 68 as a binary signal for facsimile transmission.

An output switch-over circuit 4 switches over the flow of signal in a similar manner to that of the input switch-over circuit 3. Practically, the output switch-over circuit 4 switches over the signal flow in the following three cases: the first one in which the binary signal of the received image which is obtained from the decoding circuit 71 is fed to the printer unit 72 for facsimile reception which is conducted in the same manner as that of the conventional facsimile machine, the second one in which the binary signal is fed to the portable memory recorder/reproducer 2 from the decoding circuit 71 to record it in the portable storage medium set in the portable memory recorder/reproducer 2 as a facsimile image file, and the third one in which the facsimile image file reproduced by the portable memory recorder/reproducer 2 is fed to the printer 72 as a binary signal to output it as an image.

A CPU 100 controls the entirety of the apparatus body. In the CPU 100, a ROM (not shown) in which the operation procedures (the flowchart of FIG. 6, which will be described later) are stored and a RAM used as a work area are incorporated.

Figure 2:
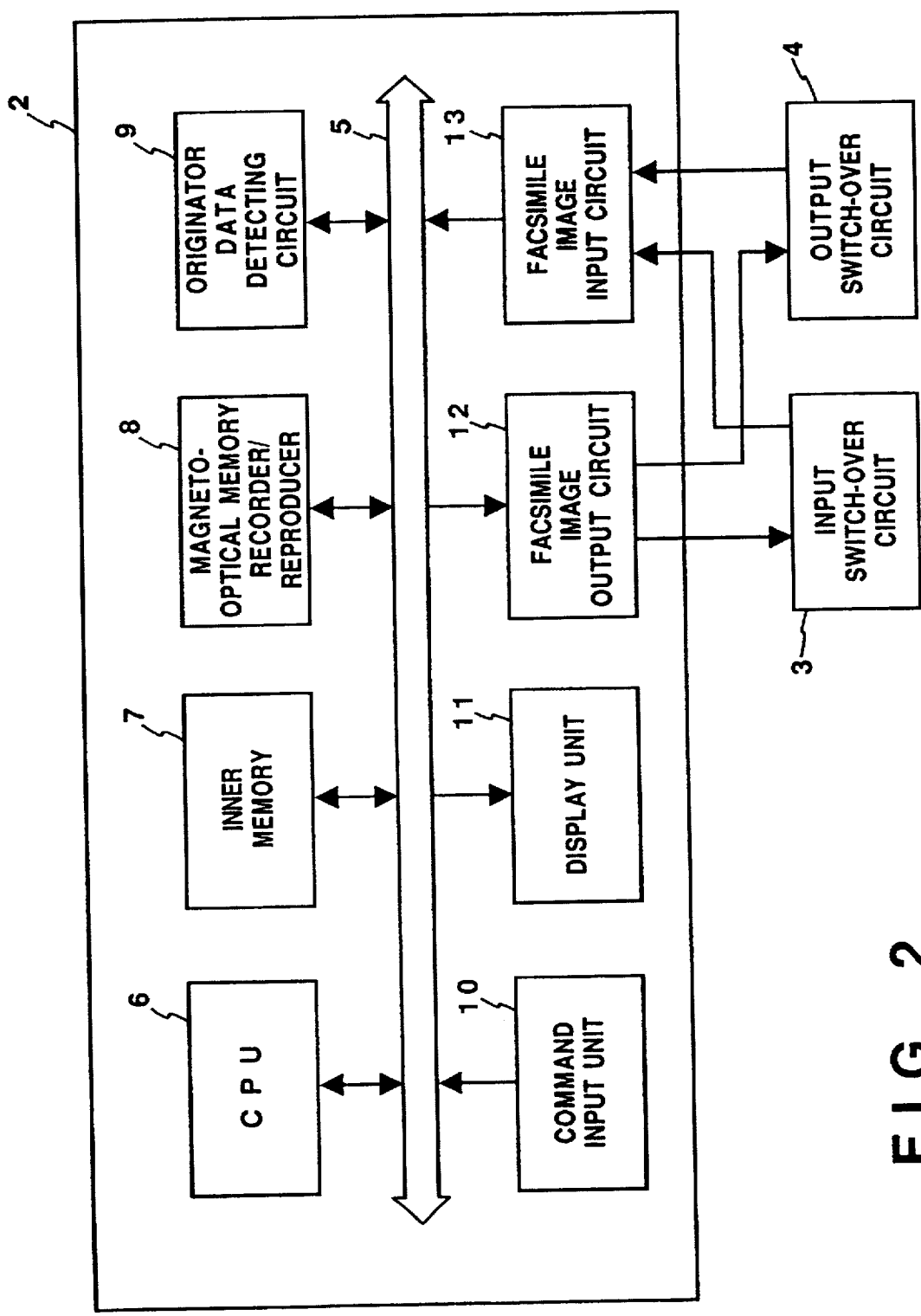
FIG. 2 is a diagrammatic view of a portable memory recording/reproducing device in the first embodiment.

FIG. 2 is a block diagram of the portable memory recorder/reproducer 2.

In FIG. 2, reference numeral 5 denotes a bus through which data is sent out or received within the portable memory recorder/reproducer 2; 6, a CPU for controlling the entirety of the portable memory recorder/reproducer; 7, an internal memory which includes a ROM in which the operation procedures of the CPU 6 (programs related to the flowchart shown in FIG. 6, which will be described later) are stored, and a RAM used as the work area of the CPU 6; 8, a magneto-optical disk memory recorder/reproducer for performing recording and reproduction of image files on the magneto-optical disk which is the portable memory medium; 9, an originator recorded data detecting circuit for detecting the originator recorded data (originator's message) added to the facsimile image, specified party names to which transmission is made and from which reception is made being registered in the circuit 9 so that it can be determined whether the detected originator is the registered one; 10, a command input unit which includes ten keys, alphabet keys and function keys; 11, a display unit for displaying the operation procedures, the list of file names and images; 12, a circuit for outputting facsimile binary image signal to both of the input switch-over circuit 3 and the output switch-over circuit 4 in the facsimile apparatus; and 13, a circuit for inputting a facsimile binary image signal from both of the input switch-over circuit 3 and the output switch-over circuit 4.

The operation of the facsimile apparatus arranged in the manner described above will be outlined below.

If a facsimile image has a A4 size (210 mm×297 mm) and the resolution thereof is 8 pixels/mm×7.7 scanning lines/mm, the total number of pixels is 1680×2287. In the conventional facsimile apparatus, since binary images are transmitted or received, the capacity of a single A4 size page is about 500k bytes. Each of the facsimile images is transmitted or received with data, such as originator record, added thereto.

Figure 3:
FIG. 3 illustrates an example of an original document to be transmitted.

FIG. 3 illustrates the originator recorded data (hereinafter simply called "originator data"). In FIG. 3, reference numeral 14 denotes part of the received facsimile image. In the received facsimile image 14, the body of the message is located below "Notice of Transmission", and the originator data indicated by reference character 15 is recorded above "Notice of Transmission". The originator data 15 consists of calender data 16 (recorded automatically by the clock function of the originator terminal), such as date and time, the originator's telephone number 17 (the number set in the facsimile machine), the originator's name 18 (or abbreviated name), the receiver's name 19, and the total number of pages in a file and data representing which page that image is on 20 (FIG. 3 indicates that the total number of pages transmitted is 3 pages and that that image is the first page in the three pages).

FIG. 4 illustrates the directory structure of the magneto-optical disk (portable memory medium) in which facsimile images are stored as image files). Initialization of the magneto-optical disk is conducted beforehand when the disk is shipped from the plant or when the instruction is given from the command input unit 19. In the magneto-optical disk, a hierarchical structure is used to control files. When the disk is initialized, a root directory 21, a transmission image directory 22 and a received image directory 23 which are subordinate directories of the root directory 21 are therefore created in the disk. An image input from the scanner 67 or received from the remote facsimile machine is stored in the magneto-optical disk under either of the directories. Strictly speaking, a date directory (24 to 27) is automatically created as the subordinate directory of the transmission image directory 22 or the received image directory 23, and the aforementioned image file is stored under the directory of that date (as the files 28 to 31 shown in FIG. 4).

Figure 5A:
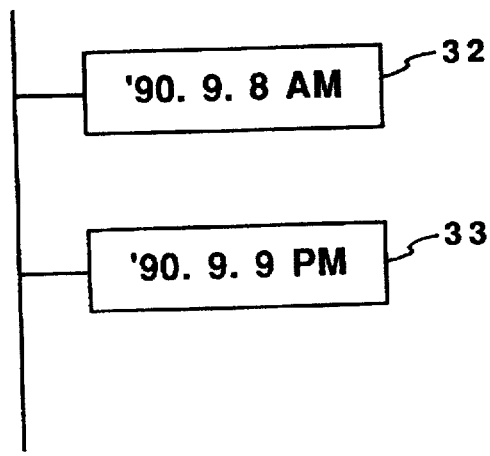
FIGS. 5A and 5B illustrate another directory of the magneto-optical disk in the first embodiment.

The date directory may be divided into two parts, i.e., morning and afternoon, as shown in FIG. 5A. In this way, it is possible for the user who receives a large amount of receptions a day to save the time and trouble required to retrieve the files stored under the directory of that date.

Figure 5B:
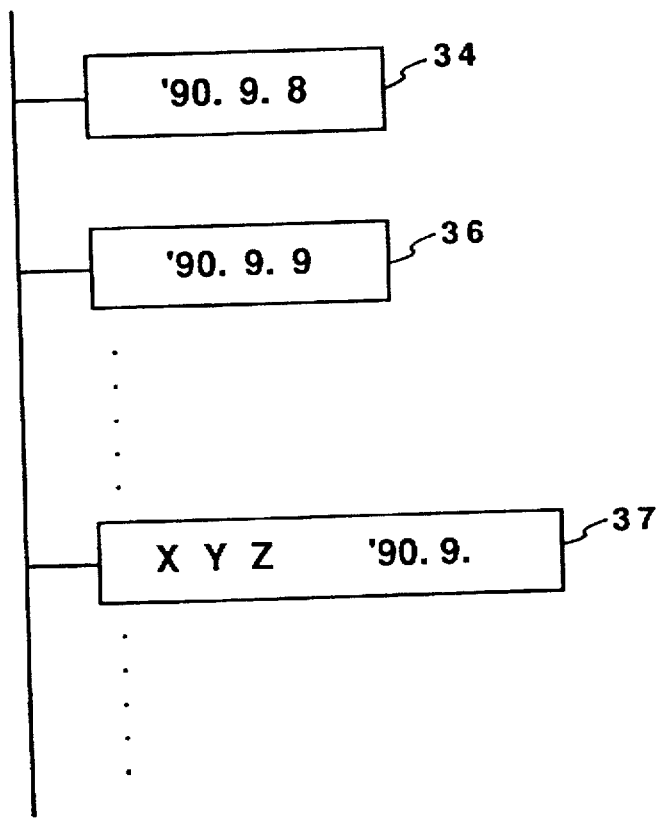
Figure 6A:
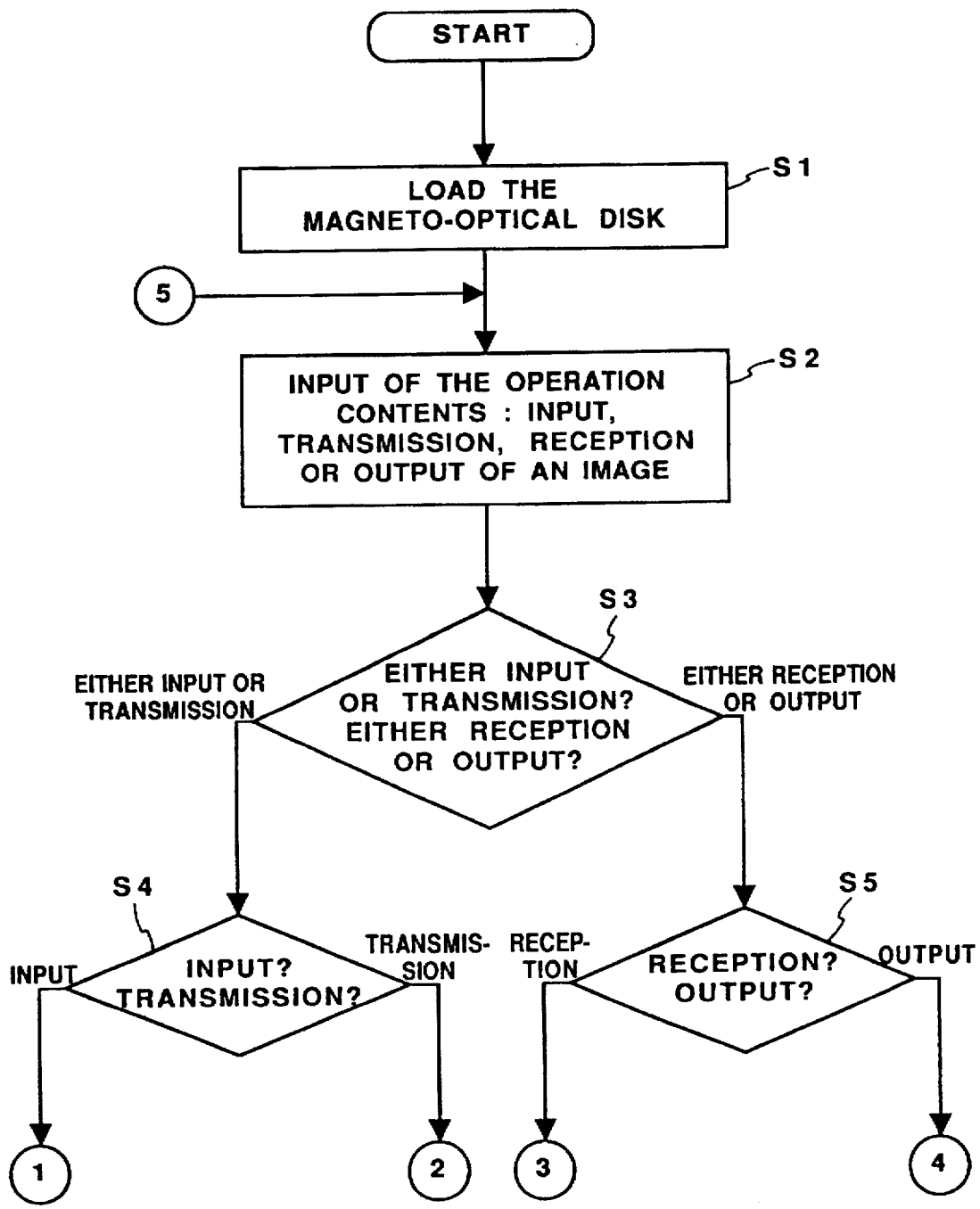
FIGS. 6A–6E are flowcharts illustrating the operations when the magneto-optical disk is loaded in the facsimile apparatus of the first embodiment.
Figure 6B:
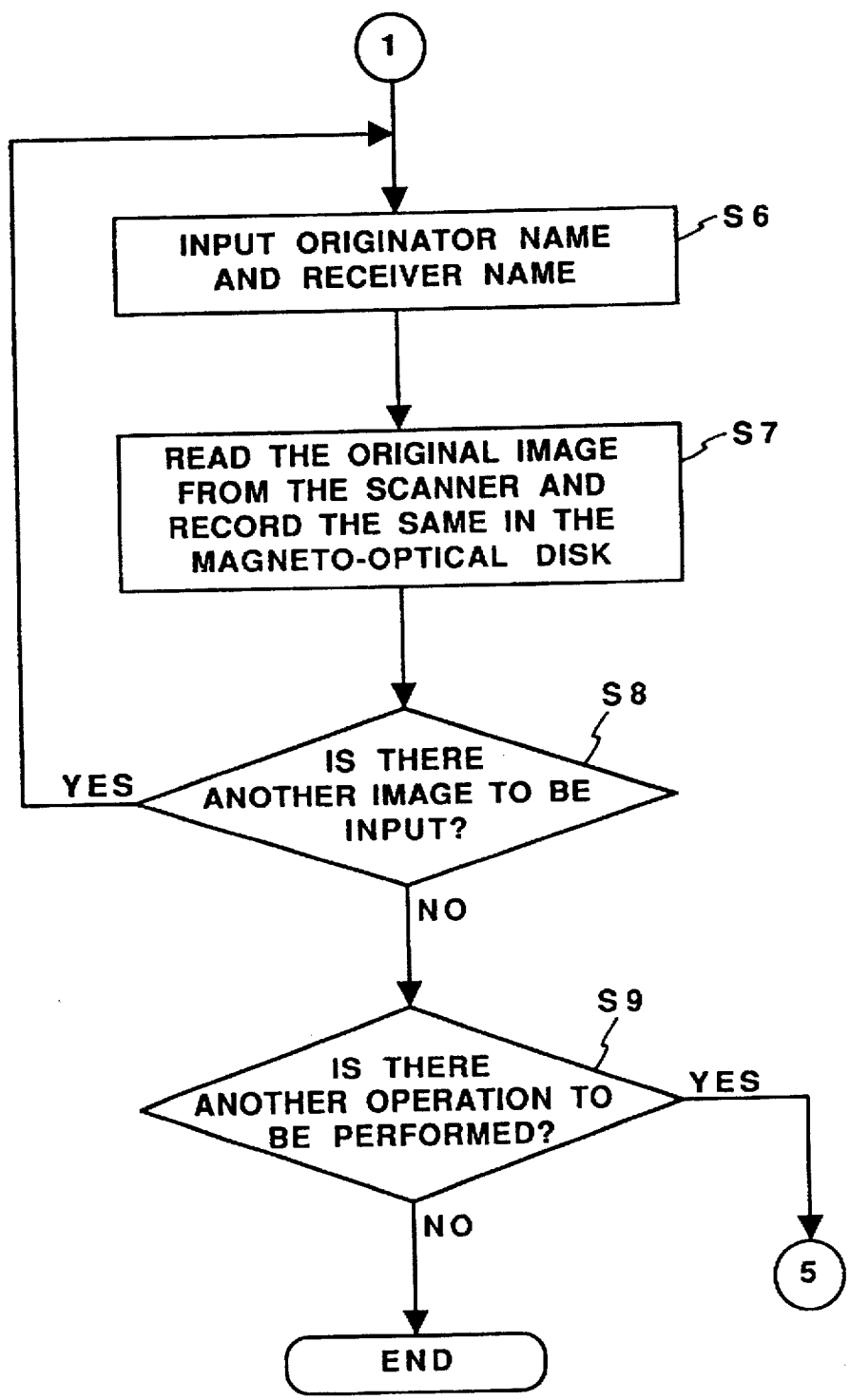
Figure 6C:
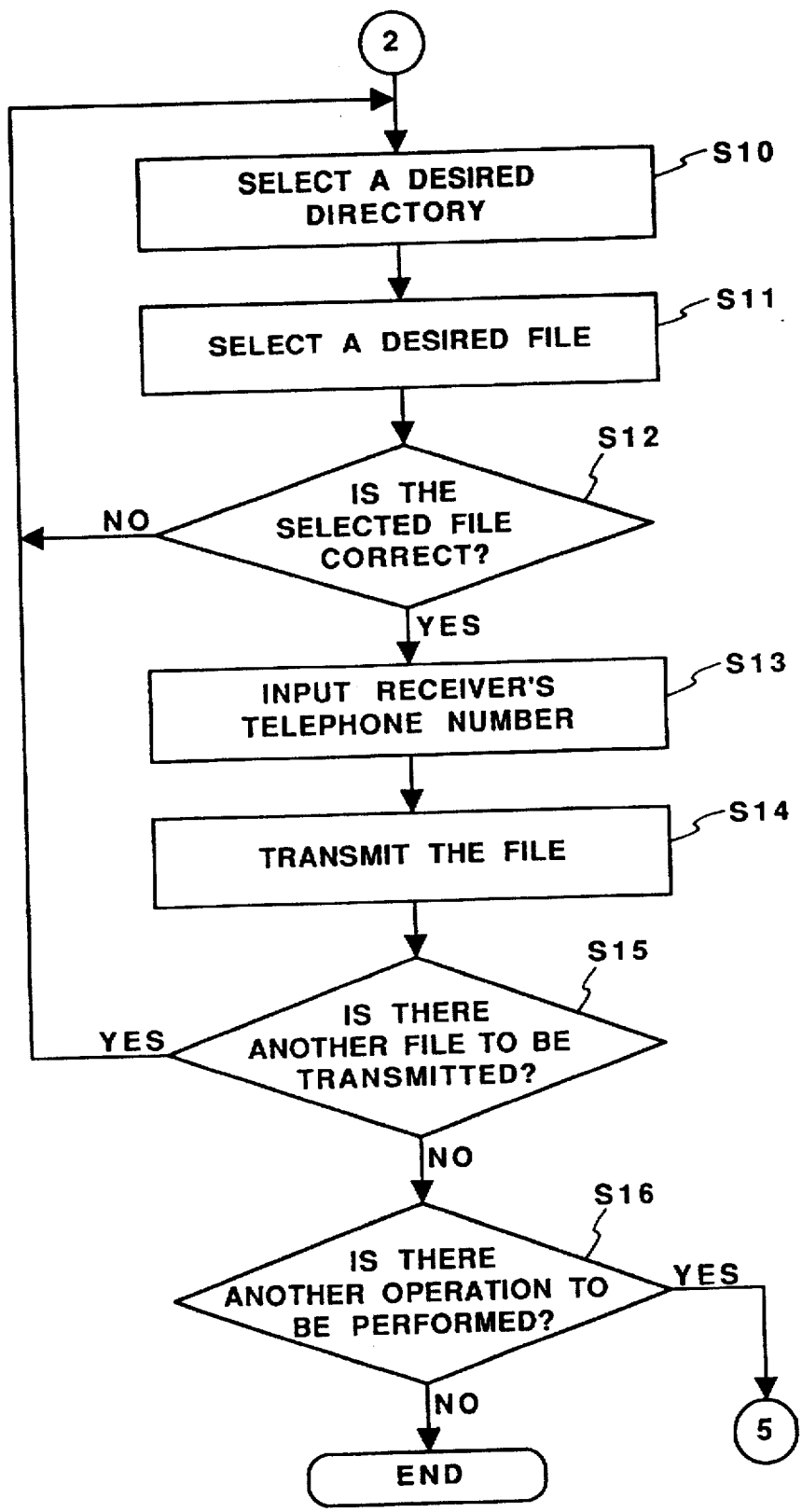
Figure 6D:
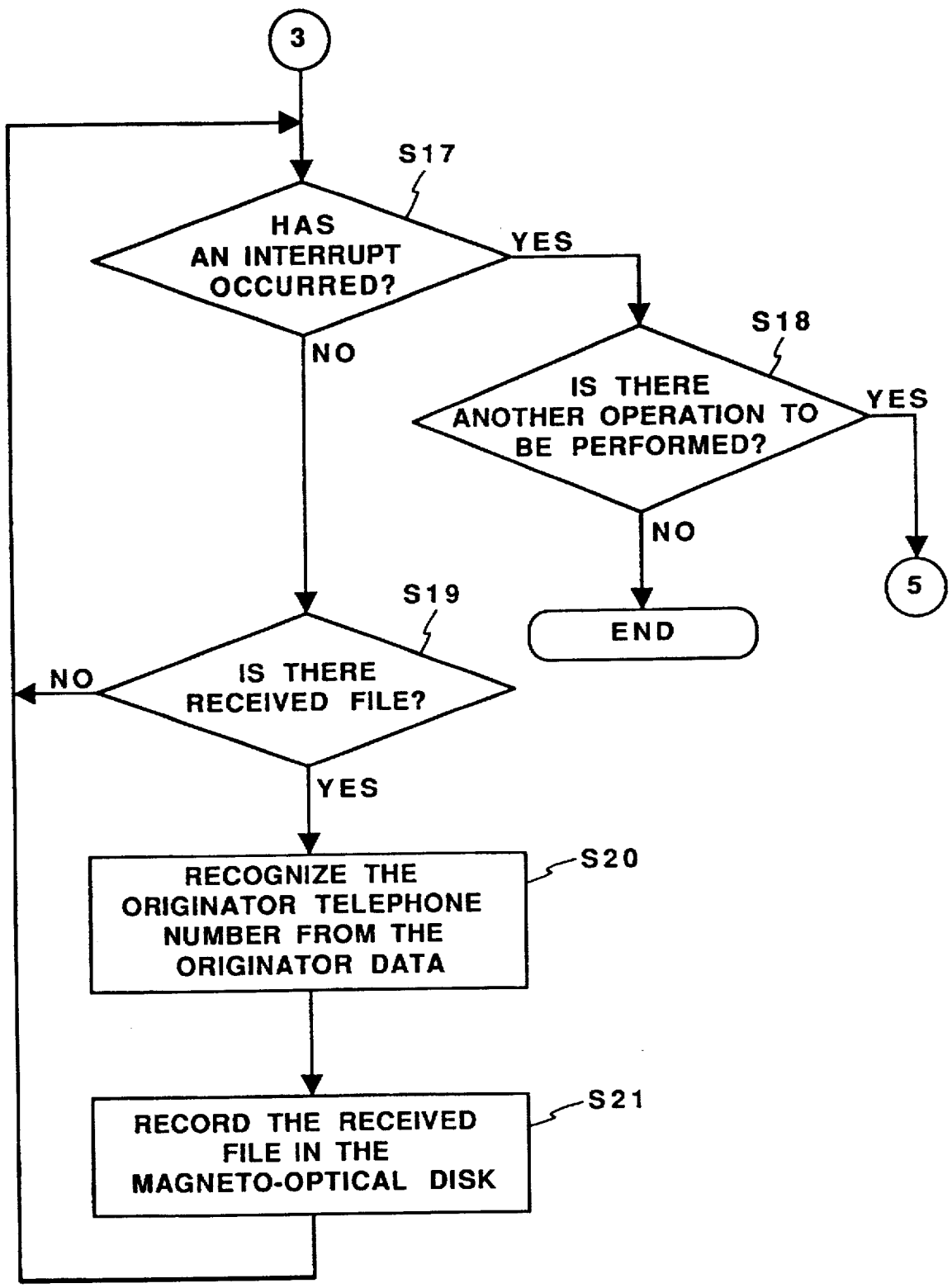
Figure 6E:
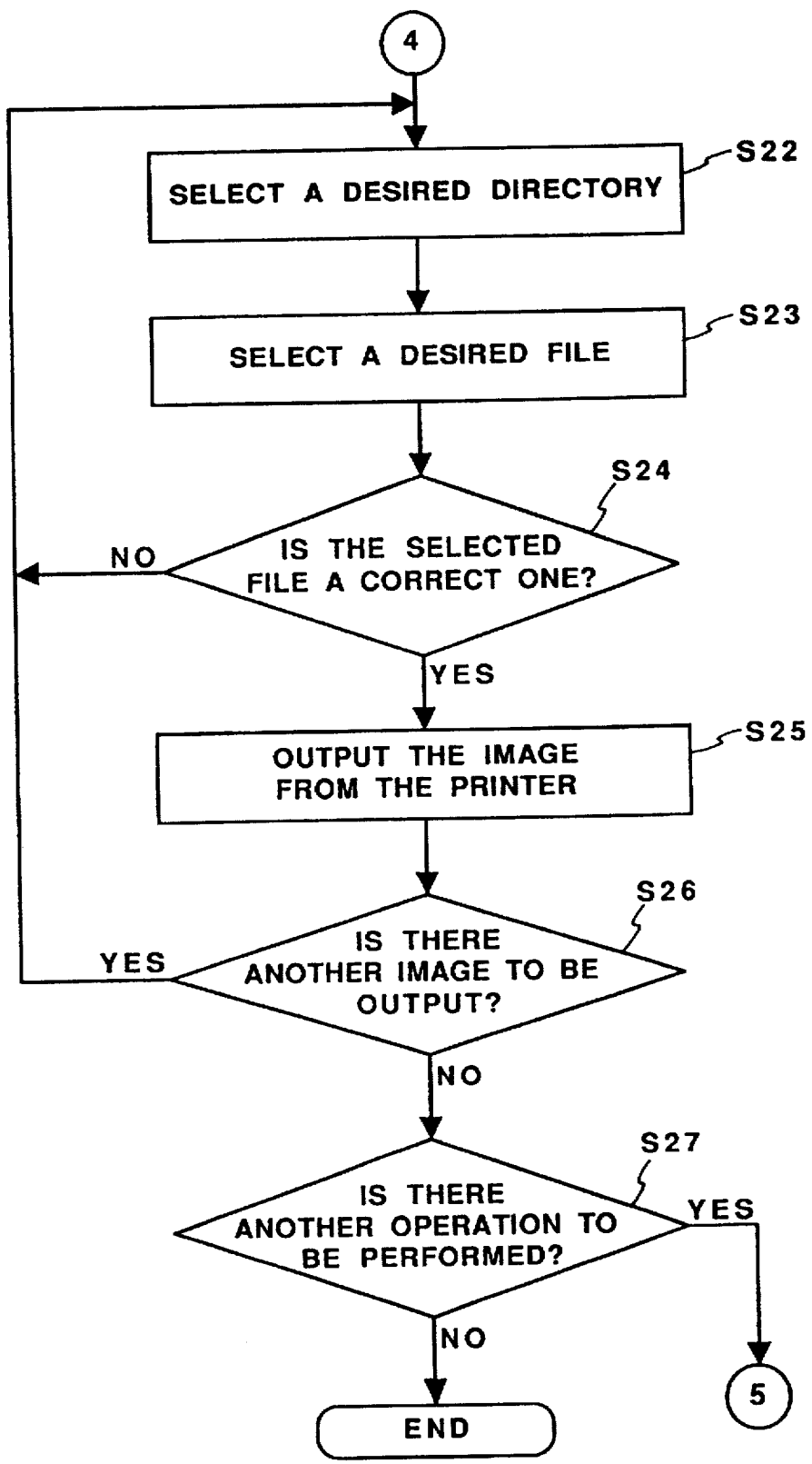

Also, if facsimile images transmitted to or received from a particularly important customer and less important facsimile images transmitted to or received as, for example, direct mails are stored under the same directory, retrieval of a certain file stored under that directory requires a lot of time. Hence, as shown in FIG. 5B, a directory indicating a special remote party may be created so that the facsimile images transmitted to or received from that customer can be stored under that directory. The customer's telephone number or the name corresponding to the telephone number may be used for registration (in the case shown in FIG. 5B, XYZ '90. 9. is used). When a facsimile image is received or transmitted, the originator's data added to the facsimile image is detected. If the originator is the one who has been registered, the facsimile image is stored under the directory of that originator. If the originator is the party who has not been registered, the facsimile image is stored under the directory indicated by reference character 34 or 36.

The operation procedures of the first embodiment will now be described with reference to FIG. 6.

First, if it is desired to perform processing in which the portable memory recorder/reproducer 2 is used, the magneto-optical disk which is the portable storage medium is loaded in step S1. When the magneto-optical disk has been loaded, a related signal is output from the portable memory recorder/reproducer 2 to the CPU 100 of the apparatus body. The CPU 100 which has received this signal waits for the input of the operation contents in step S2. To input the operation contents, a plurality of switches indicating various operation contents may be provided in the apparatus body. The user inputs the operation contents by designating one of the switches. Alternatively, a display portion for displaying a process menu, such as that shown in FIG. 7 by reference numeral 38, may be provided. In that case, the user inputs a desired menu by pressing the corresponding item (this is known by the name of touch panel). Hereinafter, the designation operation is conducted by the user under the same principle. In the latter case, the screen for recommending input of the operation contents is automatically displayed when the magneto-optical disk is loaded. However, display of the operation contents may be made when the user requests the apparatus to do so. The present invention is not limited by either of the cases.

The operation contents may include transmission, reception, input, output, copying, erasure of facsimile images. However, only facsimile transmission, reception, input and output will be described below.

In steps S3, 4 and 5, the designated contents are determined. If input of the facsimile image is designated, the process goes to step S6. If transmission is designated, the process goes to step S10. In the case of reception, the process goes to step S17. In the case of output, the process goes to step S22.

The operation of inputting an image from the scanner unit 44 in the facsimile apparatus will be described first.

In step S6, the originator's name and the receiver's name are input. These input names are used not only as the fine names but also as the originator's data added in the margin of the facsimile image. They can be altered when the facsimile image is transmitted. Since the originator's name generally remains the same, input of the same may be omitted.

After the originator's name and the receiver's name have been input, series of the original images are read by the scanner unit 44 in the facsimile apparatus body and are stored in sequence in the disk as one image file in step S7. The originator's name and the receiver's name are used to create the name of that image file. For example, if "ABC" and "XYZ" are input as the originator's name and the receiver's name, respectively, "ABC to XYX" may be created as the file name. Although the aforementioned data items are input as the information, the name of the film can be set freely by the user (the operator who performs the operation of storing the facsimile image as a file). The image file is stored in the magneto-optical disk under the transmission image director. If it is determined that the input receiver's name is one which has been registered beforehand, the image file is stored under the directory of that party name. If the receiver's name is one which has not been registered, the image file is stored under the directory of the date of that day, '90. 9. 9 (if that day is September 9th, '90).

When recording has been completed, it is determined in step S8 whether or not input of another image file is conducted. If another image file is to be input, the process returns to step S6. If there is no more image file to be input, the process proceeds to step S9, and it is determined whether or not another operation is performed. If another operation is to be performed, the process returns to step S2. If there is no more operation to be performed, the magneto-optical disk is unloaded, thus completing the operation.

The operation of transmitting a facsimile image will be described below.

When this operation is selected, the directory names which are subordinate directories of the transmission image directory 22 are read out and displayed on the display portion. The displayed directories are classified into two types: one, the date directories under which the image files for the general remote parties are stored and the other, the directories under which the image files for the special remote parties are stored.

In step S10, the directory under which the image file to be transmitted is stored is selected. If the directory "XYX" has been selected, the names of the files stored under the selected directory are displayed on the display portion. Reference character 39 in FIG. 8 denotes an example of the display made at that time.

In step S11, the file name whose transmission is desired is selected. When the file name is selected, part of the first page or demagnified image of that file is displayed on the display portion. Display of the file may be performed by scrolling or by displaying the pages of that file in sequence.

The operator views the displayed image and gives an information indicating whether the displayed image is the desired one (step S12). If the displayed image is not the one the operator desired, the process returns to step S10 and the same operations are repeated. If the displayed image is the one that the operator desired, the operator inputs the telephone number of the transmission destination (the receiver) in step S13. At that time, the originator's name and the receiver's name which are the originator's data may be altered. The input data is displayed on the display unit 11. After the displayed data is checked, the telephone number is called to connect the remote facsimile machine to the telephone line. If the receiver's name has been altered, the presently selected image file is transferred under the directory corresponding to the changed receiver's name, and the transmission record is created on the basis of that directory name.

When the telephone line has been connected, the image file is reproduced and transmitted in step S14. When transmission has been completed, the process goes to step S15, and it is determined whether or not there is another file to be transmitted. If there is another file to be transmitted, the process returns to step S10. If there is no more file to be transmitted, the process goes to step S16, and it is determined whether or not there is another operation to be performed. If there is another operation to be performed, the process returns to step S2. If there is no more operation to be performed, the magneto-optical disk is unloaded, thereby completing the operation.

Next, the operation of receiving a facsimile image and recording it will be described.

Since this operation is suspended when an interrupt command is input, it is first determined in step S17 whether or not an interrupt has occurred. If an interrupt has occurred, the process goes to step S18, and it is determined whether or not another operation is to be performed. If there is another operation to be performed, the process returns to step S2. If there is no more operation to be performed, the magneto-optical disk is unloaded.

If it is determined in step S17 that no interrupt has occurred, the process goes to step S19 and reception is awaited. In this waiting state, a loop consisting of steps S17 and S19 is formed until a file is received or an interrupt occurs.

When an incoming call arrives from a remote facsimile machine and facsimile communication starts, the originator data is detected in step S20 to recognize the originator's telephone number and originator's name. That is, it is determined whether the name and telephone number are those which have been registered, and the directory under which the received image is to be stored and the file name of that image are determined.

In step S21, an image is received, and an image file is created and stored under the previously determined directory. After recording is completed, the process returns to step S17 and S19 and reception is awaited again.

To recognize the originator of the received image, the following processings are performed in this embodiment.

As mentioned above, the received image has the originator data 15 (see FIG. 3) at the top thereof. The contents of the originator data, however, differ depending on the manufacturer or the type of the facsimile machine used by the originator.

That is, when the remote parties A and B use facsimile machines manufactured by different makers, the format of the originator data transmitted from these remote parties A and B differs. For example, the position of the originator abbreviated name 18 or the method of expressing the calender data 16 in the received images from the remote parties A and B may differ.

If the remote party A possesses a single facsimile machine, the originator abbreviated name and the originator telephone number are present in the image received from the remote party A at the same position and in the same font. In other words, if the originator is the same, the area denoted by reference character 21 in FIG. 3 remains the same.

Hence, image data (the area 21 in FIG. 3) on the originator abbreviated name and the originator telephone number of each of a plurality of communication parties with which communications are made frequently, the location of the image data and the size of the image data (hereinafter these data items are referred to as matching data) are stored beforehand. When an image is received, the image of the originator data located at the top of each page of the received image is compared with the image of the individual matching data. If they coincide with each other, it is determined that the received image is from the party corresponding to that matching data.

In this embodiment, an originator table such as that shown in FIG. 10 is created for each of the important communication parties. The table contains the directory name under which the received image is stored, the position and size data, and the image to be matched. In FIG. 10, "EOF" is a code which indicates that no data exists beyond that symbol. The distance from the left end of the recording paper is used as the position data. Since the normal originator data is recorded at almost the same distance from the top edge of the recording paper, the distance from the top edge is made fixed.

When an image is received, the received image data is decoded, and at least the portion thereof which contains the originator data is converted into a dot image. XOR (exclusive OR) operation is performed on the basis of the position data on the converted image and the individual matching image data in the table shown in FIG. 10. In XOR operation, if the converted image and the matching image coincide with each other, all the dots have logical "0" level. If they do not coincide with each other, dots having logical "1" level are present. Therefore, determination of coincidence can be made from the state of the dots which is the results of this logical operation. If it is determined that the two images do not coincide with each other, the converted image is compared with a subsequent matching image. The comparison continues until "EOF" is detected. If it is determined that the matching image which matches the converted image exists, the received image is stored under the directory corresponding to that matching image. If no matching image which matches the converted image exists at the time when "EOF" has been detected, the received image is recorded under the directory corresponding to the received date.

When data is registered in the originator table, one of the received images having the originator data to be registered is designated, and the distance from the left edge of the matching image and the size and the directory name under which the images from that originator are stored are input from the keyboard. The leading portion of the designated received image is decoded, and an image thereof is cut according to the designated position and size. The cut out image, the designated position and size data and the directory name are added to the originator table.

The originator data is not the image optically read by the originator terminal but that directly added to the image. In this embodiment, the image directly cut out from the received image is registered in the originator table. Therefore, matching of one dot-one dot correspondence is theoretically possible.

In the case where the telephone numbers of the two parties are exchanged in the form of signals exchanged at the initial stage of the communication, the originator may be detected on the basis of the telephone number.

Next, the operation of outputting an image from the printer unit in the facsimile apparatus will be described.

When this operation is selected, the directory names which are subordinate directories of the received image director 23 in the magneto-optical disk are read out and displayed on the display portion. When the directory is selected in step S22, the file names under that directory are read out and displayed on the display portion.

When the file name to be printed out is selected in step S23, part of the first page or demagnified image of that file is displayed on the display portion in the same manner as that described above.

Thereafter, in step S24, it is determined whether the displayed image is the desired one. If the displayed image is the desired one, the process goes to step S25 and the designated image file is reproduced and printed out by the printer unit 49. After printing is completed, it is determined in step S26 whether or not another file is output. If there is another file to be output, the process returns to step S22. If there is no more file to be output, the process goes to step S27.

In step S27, it is determined whether or not another operation is performed. If there i's another operation to be performed, the process returns to step S2. If there is no more operation to be performed, the magneto-optical disk is unloaded, thereby completing the operation.

Input and transmission of images which are performed separately have been described. However, the input image may be transmitted immediately after it has been input. Also, although reception and output of images which are performed separately have been described, the received image may be output immediately after it has been received.

Furthermore, when the signal indicating whether or not the magneto-optical disk is loaded, which is output from the portable memory recorder/reproducer 2, is not detected, transmission and reception of the facsimile image can be performed in the same manner as that of the conventional facsimile communication.

As will be understood from the foregoing description, in this embodiment, since facsimile images are stored in the portable memory medium using the data added to the facsimile image when it is transmitted or received, all the images to be transmitted and received can be recorded and be thus stored without requiring space.

Furthermore, since the originator data which is added to the facsimile image when it is transmitted or received is detected and the facsimile image is stored in the portable memory medium under the directory corresponding to the detected originator data, facsimile images can be stored according to the state thereof (for example, the name of destination or date). This facilitates retrieval of the facsimile images.

Furthermore, even when the facsimile image store din the memory medium has been printed out, if it is not deleted, it remains on the magneto-optical disk. It is therefore possible to print it out again when necessary.

As stated above, in the first embodiment of the present invention, management of images used in facsimile communications can be facilitated.

A second embodiment of the present invention will now be described. The entire structure of the second embodiment is the same as that of the first embodiment.

The image to be transmitted is either the one read by the scanner unit 67 or the one read by a full-color image reading device, such as a digital color copying machine 50, provided independently of the facsimile apparatus. The image obtained in the former case is the image recorded on a sheet of paper having a predetermined size, as in the case of the normal facsimile apparatus. The image obtained in the latter case is that recorded on sheets of paper having various sizes that the digital color copying machine 50 can read. The read image is input to the input switch-over circuit 3 as a binary image. The input switch-over circuit 3 switches over the signal flow. i.e., the circuit 3 switches over the case in which the image read by the scanner unit 67 is fed to the encoding circuit 68 as a binary signal for normal facsimile transmission and the case in which the image reproduced from the portable memory recorder/reproducer 2 is output to the encoding circuit 68 as a facsimile image for facsimile transmission. When the original image read by the digital color copying machine 50 is stored in the portable storage medium (magneto-optical disk), that image can be transmitted through the facsimile communication.

The received image is output from the printer unit 72 or stored in the portable storage medium through the portable memory recorder/reproducer 2 and then reproduced by the digital color copying machine 50. In the former case, the received image is output on a sheet of recording paper having a predetermined size, as in the case of the normal apparatus of the above-described type. In the latter case, there are various types of sizes in the recording paper depending on the output capability of the digital color copying machine 50. The received image is input to the output switch-over circuit 4 through the decoding circuit 71 as a binary signal. The output switch-over circuit 4 switches over the flow of the signal, like the input switch-over circuit. That is, the output switch-over circuit 4 switches over the case in which the binary signal from the decoding circuit 71 is output to the printer unit 72 for normal facsimile reception, the case in which the binary signal from the decoding signal 71 is supplied to the portable memory recorder/reproducer 2 and is stored in the portable memory medium loaded in the portable memory recorder/reproducer 2 as an image file, and in which the facsimile image file reproduced from the portable memory recorder/reproducer (which includes both the image read by the digital color copying machine 50 and the image received by facsimile communication) is output to the printer unit 72.

Figure 12:
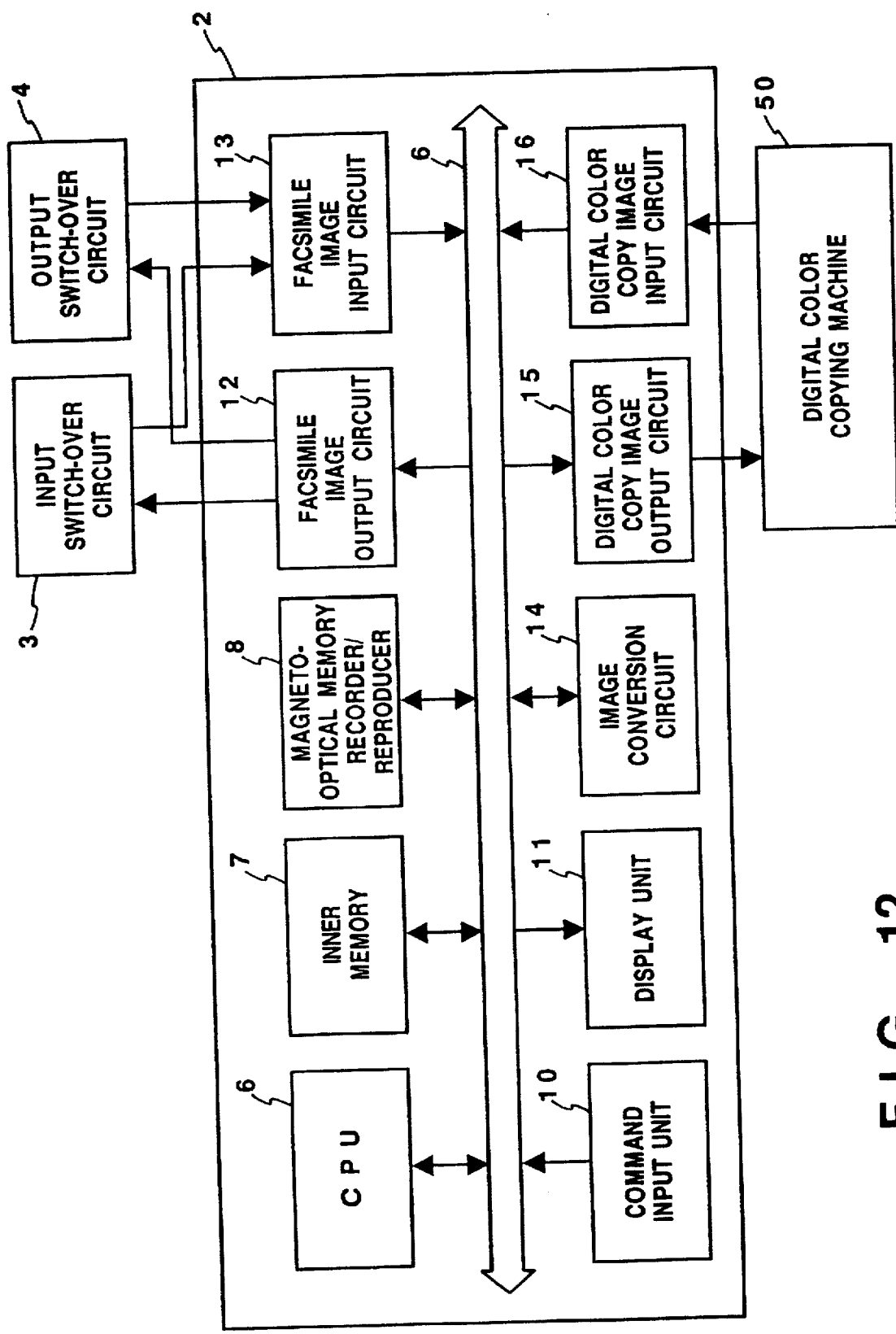
FIG. 12 is a diagrammatic view of the portable memory recorder/reproducer in the second embodiment.

FIG. 12 is a block diagram of the portable memory recorder/reproducer in the second embodiment of the present invention.

In FIG. 12, reference characters 6 through 13 denote parts which are the same as those described in the first embodiment. Reference numeral 14 denotes an image converting circuit (which will be described below in detail) for performing conversion between facsimile image files and full-color image files; 15, a circuit for outputting a full-color image signal to the digital color copying machine 50; and 16, a circuit for inputting a full-color image signal from the digital color copying machine 50.

Figure 13:
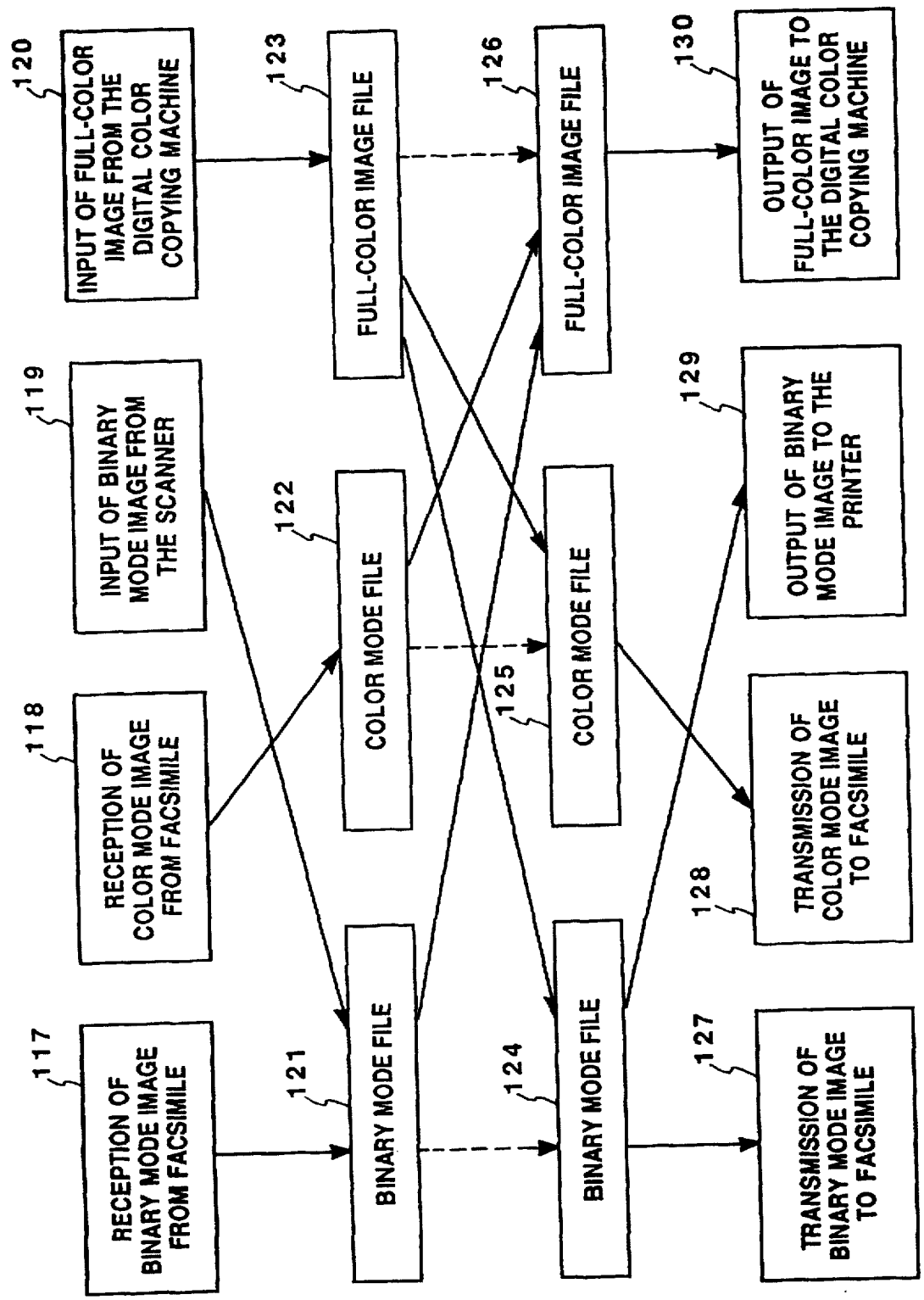
FIG. 13 illustrates the file conversion contents in the second embodiment.

FIG. 13 illustrates the types of the image files input to and output from the portable memory recorder/reproducer 2 and how the image converting circuit converts the image file.

If a facsimile image is A4 size (210 mm×297 mm) and if the resolution thereof is 8 pixels/mm×7.7 scanning lines/mm, the total number of pixels is 1680×2287 pixels. Since the images transmitted and received by a conventional facsimile machine are binary images, the capacity of a sheet having A4 size is about 500k bytes. The image file of this binary image is called binary mode file.

The image read by the digital color copying machine can have any size from the name card size to A3 size (the sizes that can be read depend on the capability of the digital color copying machine). The signal read by the digital color copying machine is a digital full-color image signal in which gray levels of 8 bits are given to each of R, G and B per pixel. If the image read by the digital color copying machine has A4 size and if the revolution thereof is 8 pixels/mm×7.7 scanning lines/mm and hence the total number of pixels is 1680×2287, as in the case of the normal facsimile image, a capacity of about 12 M bytes is necessary to store one sheet of A4 size. The image file of this full-color image is called a full-color image file.

A file of each bit of 8 bits obtained by separating a full-color image file into R, G and B components is called a color mode file (for example, a file of bit 0 of R component). That is, a single full-color image file can be expressed by 24 color mode files, because 3×8=24. Since the capacity of a single color mode file is about 500 k bytes, the capacity of the entire 24 color mode files is about 12 M bytes, like the full-color image file. Each page of the color mode files is transmittable or receivable as a facsimile image.

In FIG. 13, when the received image is stored by the portable memory recorder/reproducer 2, if the image transmitted from the remote facsimile machine is a binary mode image, the image is received (process 117), and the received image is fed to the portable memory recorder/reproducer 2 and is stored in sequence in the magneto-optical disk as the binary mode file. After reception has been completed, the image converting circuit 14 converts the stored binary mode file into a full-color image file 126 for the digital color copying machine. In that case, the image converting circuit 14 creates a white and black image file by giving 3 bytes of R, B and B to each of pixels of the original binary image. That is, the image converting circuit 14 converts a pixel of "1" into "FFH" and a pixel of "0" into "00H" (H indicates a hexadecimal digit). Conversion may be made after facsimile reception is completed or when the image is output to the digital color copying machine (processing 130). The full-color image file created at this time may be erased after it has been output to the digital color copying machine.

When the received image is stored by the portable memory recorder/reproducer 2, if the image transmitted from the remote facsimile machine is a color mode image, the facsimile machine of this embodiment receives that image consisting of 24 pages (processing 118), and sends it to the portable memory recorder/reproducer 2. The portable memory recorder/reproducer 2 records the image in sequence in the magneto-optical disk as a color mode file 122. After the reception has been completed, the image converting circuit 14 converts the received image into a full-color image file 126. In this case, the image converting circuit 14 first creates 8 bit files for each of R, G and B components by synthesizing the files created separately for each bit and then creates the original full-color image file by synthesizing R, G and B components. The conversion may be made after facsimile reception has been completed. After the conversion has been completed, 24 color mode files 122 may be erased.

When there is input of a binary mode image from the scanner unit in the facsimile apparatus (processing 119), the read binary signal is fed to the portable memory recorder/reproducer 2 and is recorded in sequence in the magneto-optical disk as a binary mode file 121. After the input has been completed, the same processing as that performed when the binary mode image is transmitted from the remote facsimile machine is conducted (processing 117).

When there is input of a full-color image from the digital color copying machine (processing 120), the read full-color signal is fed to the portable memory recorder/reproducer and is stored in sequence in the magneto-optical disk as a full-color image file. Although the size of the read image can be selected, the image is recorded at this time as a full-color image file 123 of A4 size (1680×2287 pixels) by performing enlargement, demagnification, decomposition or composition on the image depending on the size of the paper (the size of the recording paper which is used for facsimile transmission and reception). After the input has been completed, the image converting circuit 14 converts the stored image into both a binary mode file 124 and a color mode file 125. The binary mode file 123 is a file obtained by image processing the full-color image file 123. Conversion into the binary mode file 124 may also be made when the input has been completed, when binary mode facsimile transmission is performed (processing 127) or when an image is output to the printer in the facsimile apparatus (processing 129). After transmission or output, the binary mode file 124 may be erased. Similarly, conversion into the color mode file 126 may also be made when the input has been completed. Alternatively, conversion into the color mode file 126 may be made when color mode facsimile transmission is performed (processing 128). After transmission has been completed, the stored color mode file 125 may be erased (the arrows of broken lines in FIG. 13 indicate that the respective files can be handled in the same manner).

Figure 14:
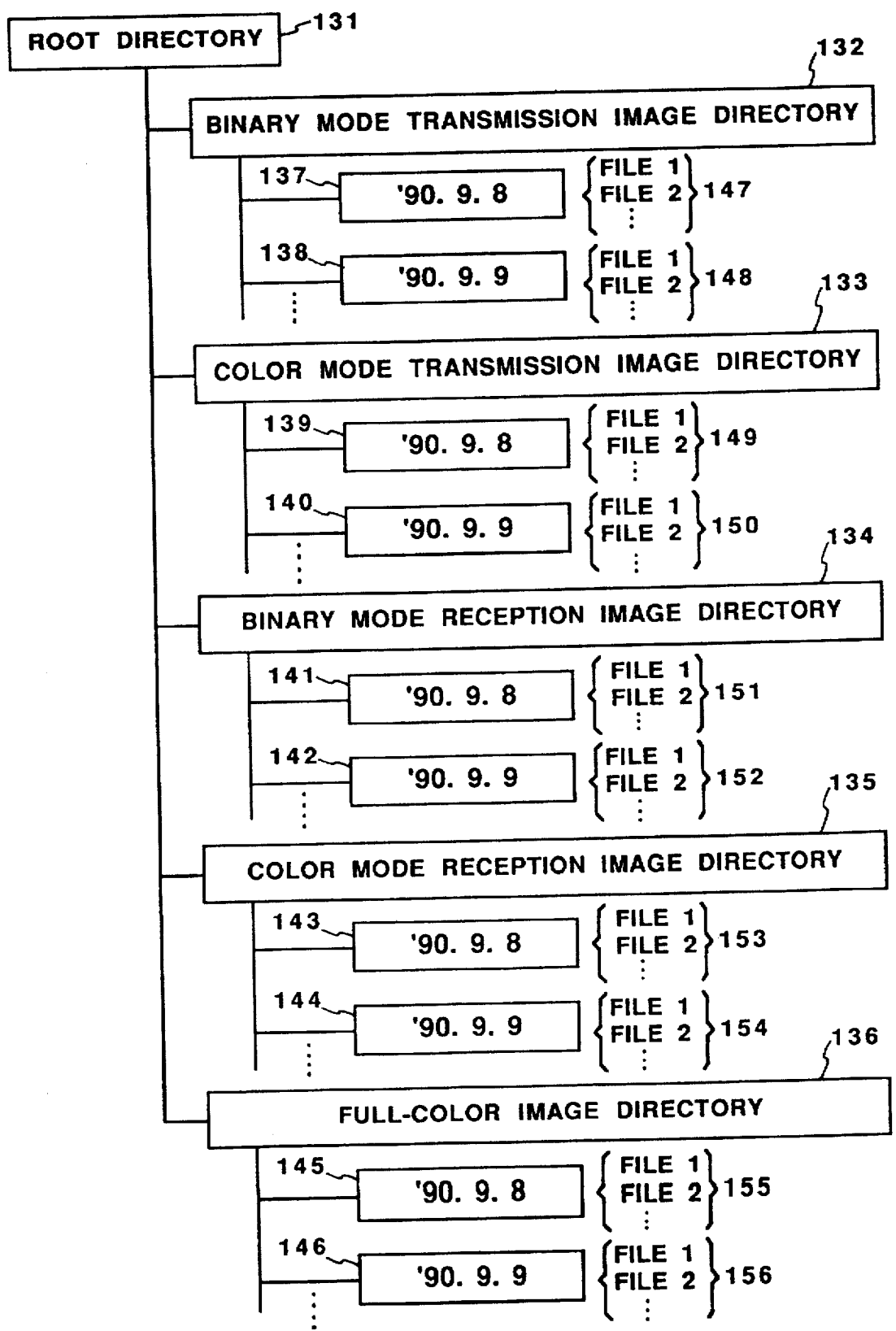
FIG. 14 illustrates a directory of a portable storage medium in the second embodiment.

FIG. 14 illustrates an example of a directory structure of a magneto-optical disk in which the files are stored in the second embodiment. Initialization of the magneto-optical disk is conducted beforehand when the disk is shipped from the plant or when the user gives the instruction to the portable memory recorder/reproducer 2. When the disk is initialized, a root directory 131, a binary mode transmission image directory 132, a color mode transmission image directory 133, a binary mode reception image directory 134, a color mode reception image directory 135 and a full-color image directory (which may be divided into a full-color transmission image directory and a full-color reception image directory) are automatically created in the disk. When an image file is input at the time of input, transmission and reception of images, a date directory, such as that indicated by 137 through 146, is automatically created under either of the directories, and the input file is stored under the created directory with a file name added thereto (147 through 156). Dating is achieved by reading date data at which recording occurs from a timer operated by a battery (not shown).

To achieve the aforementioned structure and operation, the facsimile apparatus of the second embodiment will be operated in the manner described below with reference to FIG. 15. The following description is limited to the operations of writing data in and reading out data from a magneto-optical disk, and explanation of the normal facsimile transmission and reception is omitted, because they are known techniques.

First, the magneto-optical disk which serves as the portable storage medium is loaded on the portable memory recorder/reproducer 2 in step S101. If the capacity of the magneto-optical disk is 600 M bytes, about 1200 pages of binary mode image or about 50 pages of full-color image can be stored in the magneto-optical disk. Of course, the number of pages that can be stored varies when these two types of images are stored at the same time or when converted files are recorded. Although it will be described below all the binary mode files, color mode files and full-color image files are stored, unnecessary files may be erased, as mentioned in connection with FIG. 13.

Although image compression will not be mentioned in the following description, the number of pages that can be recorded can be increased by recording compressed images.

When the magneto-optical disk has been loaded, the contents of the operation are input in step S102. The contents of the operation (instruction) will be input by pressing a desired button in the buttons specially provided for the input of the operation contents or by selecting the desired number in the numbers and corresponding operation contents which are displayed on the display portion (hereinafter, input of the contents of the operation is conducted in the above-described manner). The contents of the operations include input, output, copying and erasure of images. The following description is, however, limited to input and output of the images.

In step S103, it is determined whether the input contents of the operation is input or output of an image. If an image is to be input, the process goes to step S104. If an image is to be output, the process goes to step S106. In step S104, selection of the input device is made, that is, it is determined whether the image is to be received by facsimile communication and is recorded, the image is to be read by the scanner unit 67 in the facsimile apparatus or the image is to be input from the scanner of the digital color copying machine 50. In step S105, the contents of the selection are determined, and if the received facsimile image is to be recorded, the process goes to step S108. If the image is to be input from the scanner 67 in the facsimile apparatus, the process proceeds to step S116. If the image is to be input from the scanner of the digital color copying machine, the process goes to step S121.

If it is determined in step S103 that the image is to be output, the output device is selected in step S106, that is, it is determined whether the facsimile image is reproduced from the disk and is transmitted to a remote facsimile machine, the reproduced image is to output to the printer unit 72 of the facsimile apparatus or the reproduced image is to be output to the digital color copying machine 50. In step S107, the contents of the selection are determined, and if it is the facsimile image transmission, the process goes to step S126. If the image is to be output from the printer unit 72 in the facsimile apparatus, the process goes to step S136. If the image is to be output from the printer of the digital color copying machine 50, the process goes to step S142. If the process goes to either step S108, S116, S126 or S136, the portable memory recorder/reproducer must be connected to the facsimile machine, as shown in FIG. 1. If the process goes to either step S121 or S143, the portable memory recorder/reproducer must be connected to the digital color copying machine 50. Each of the facsimile apparatus and the digital color copying machine 50 may be provided with a portable memory recorder/reproducer.

First, the process of recording the received facsimile image by the portable memory recorder/reproducer will be described.

Since this operation is suspended when an interrupt command is input, it is first determined in step S108 whether or not an interrupt has occurred. If an interrupt has occurred, the process goes to step S109, and it is determined whether or not another operation is to be performed. If there is another operation to be performed, the process returns to step S102. If there is no operation to be performed, the magneto-optical disk is unloaded.

If it is determined in step S108 that no interrupt has occurred, the process goes to step S110 and reception is awaited. In this waiting state, a loop consisting of steps S108 and S110 is formed until a file is received or an interrupt occurs. When an incoming call arrives from a remote facsimile machine and facsimile communication starts, it is determined in step S110 whether the image which will arrive is a binary mode image or color mode image. If the binary mode image is to arrive, the process goes to step S112, and the received image is stored as a binary mode file under the today's directory, e.g., under the "'90.9.9" directory indicated by reference character 142, if today is Sep. 9th, 1990, which is the subordinate directory of the binary mode reception image directory 134. If the directory of the corresponding date does not exist, it is automatically created by the calender function. The name of the file to be recorded is automatically put by the facsimile apparatus. For example, the reception time provided by the clock function is used as the file name. After reception has been completed and recording of the binary mode file has thus been completed, the process goes to step S113 and a full-color image (black and white image) is created, as mentioned in connection with FIG. 14, and the created file is recorded under the same file name under the "'90.9.9" directory (indicated by reference character 146) which is the subordinate directory of the full-color image directory 136. After recording, the process returns to the loop consisting of steps S108 and S110 and reception is awaited.

If the image which will arrive is a color mode image, the process goes to step S114, and the received image is recorded as a color mode file under "'90.9.9" directory indicated by reference character 144 which is the subordinate directory of the color mode reception directory 135. At that time, the file name is automatically put in the same manner as that of the aforementioned case. After reception has been completed and recording of the color mode file has thus been completed, a full-color image file is created in step S115, as mentioned in connection with FIG. 13, and the created file is recorded under the same file name under the "'90.9.9" directory (indicated by reference character 146) which is the subordinate directory of the full-color image directory 136. After recording, the process returns to the loop consisting of steps S108 and S110 and reception is awaited.

Figure 15A:
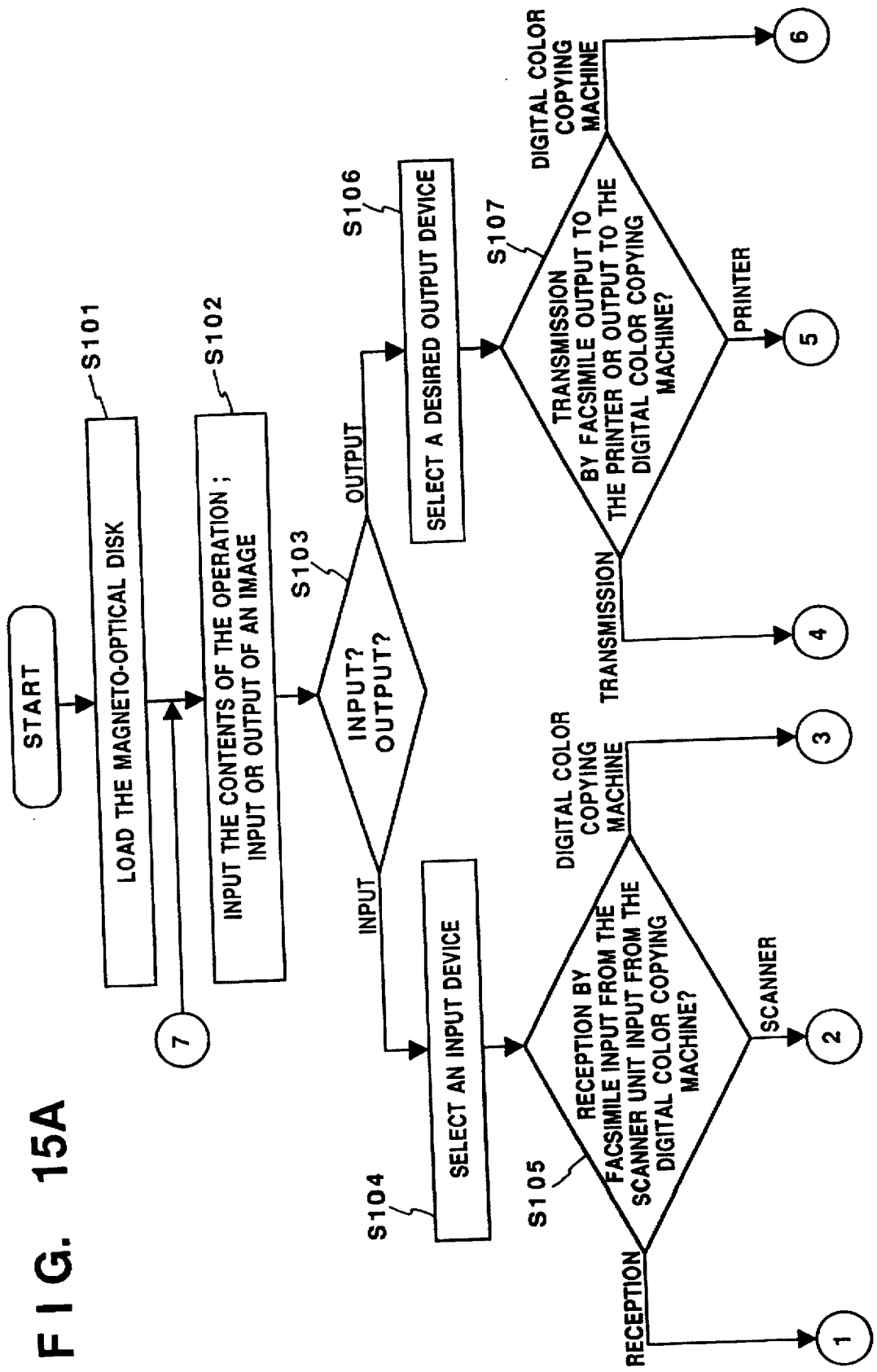
Figure 15C:
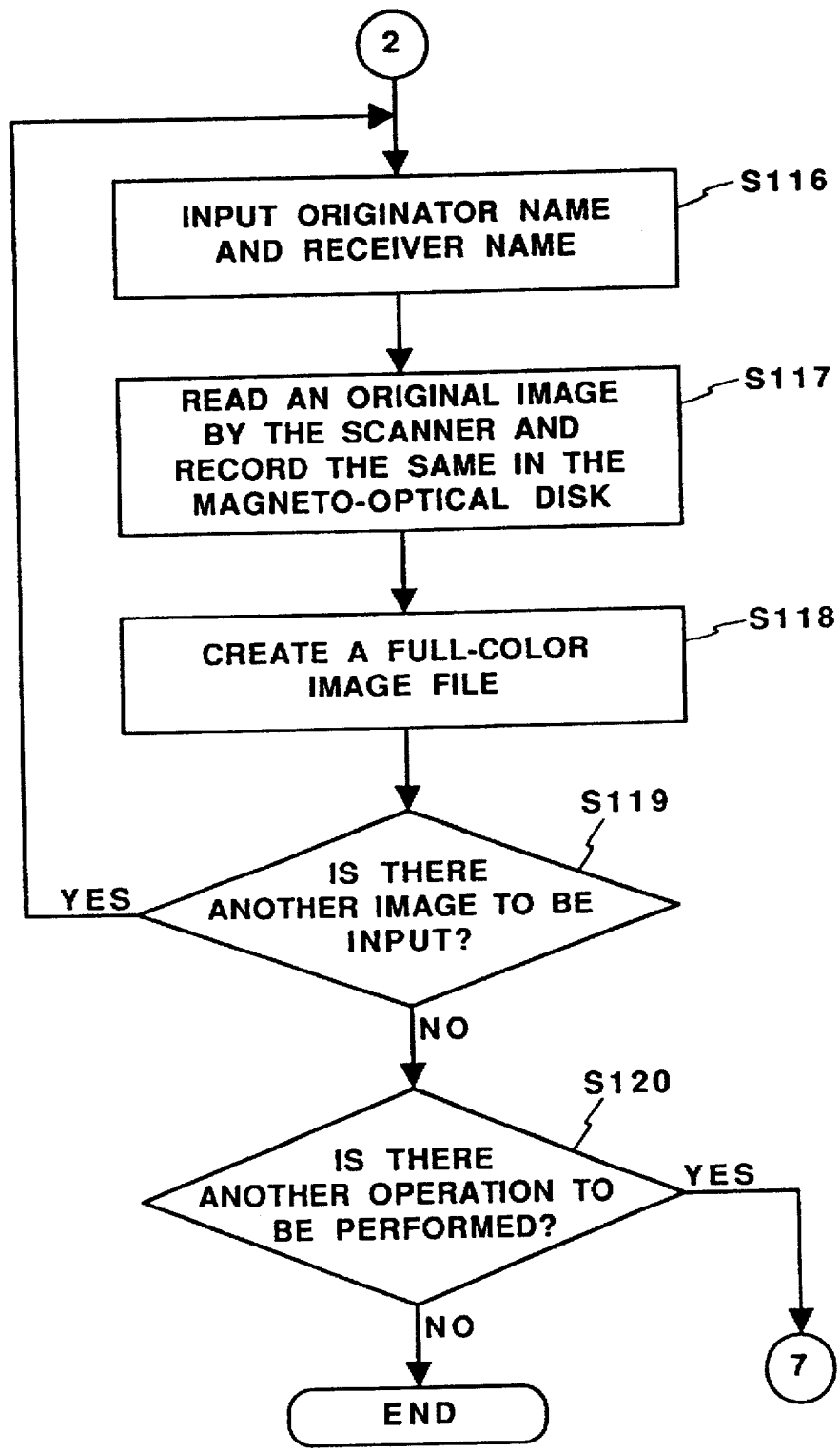

Next, the operation of inputting an image from the scanner unit 67 in the facsimile apparatus will be described with reference to FIG. 15C.

First, the originator's name and the receiver's name are input in step S116. The input data is used not only as the file name but also as the originator data which is to be added at the top of the facsimile image. Of course, the input data can be altered at the time of transmission. The originator data is shown in FIG. 3.

When the originator's name and the receiver's name have been input in step S116, series of original document images are read from the scanner unit 67 in the facsimile apparatus in step S117 and are recorded as a single binary mode file in the magneto-optical disk under the directory of "'90.9.9" (indicated by reference character 138 in FIG. 14), today's date, which is the subordinate directory of the binary mode transmission image directory 132. At that time, the name of the file is created using the originator's name and the receiver's name, like, for example, "NO. 1 ABC (Co., Ltd) to XYZ (Co., Ltd.)" ("NO. 1" indicates series No. of the file).

After recording has been completed, a full-color image (which is a black and white image) is created in step S118, as mentioned in connection with FIG. 13, and the created full-color image is recorded under the same file name under the directory "'90.9.9", today's date, indicated by reference character 146), which is the subordinate directory of the full-color image directory 136. After recording has been completed, it is determined in step S119 whether another file image is to be input. If there is another file to be input, the process returns to step S116. If there is no more file to be input, the process proceeds to step S120, and it is determined whether another operation is to be performed. If there is another operation to be performed, the process returns to step S102. If there is no more operation to be performed, the magneto-optical disk is unloaded.

Figure 15D:
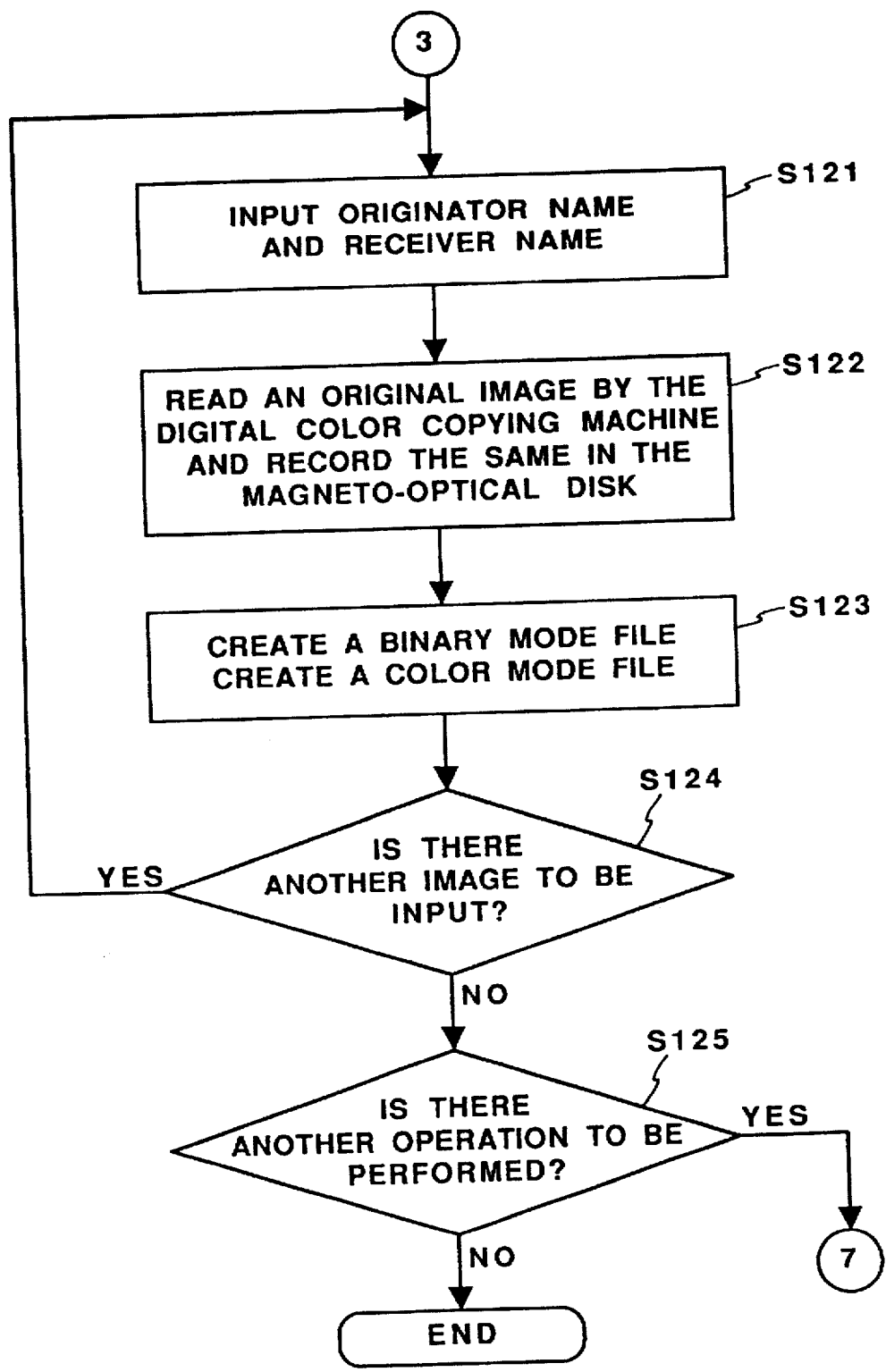

Next, the operation of inputting an image from the scanner of the digital color copying machine will be described with reference to FIG. 15D.

First, the originator's name and the receiver's name are input in step S121 in the same manner as that described in step S116.

Next, series of original document images are read from the digital color copying machine in step S122 and are recorded as a single full-color image file in the magneto-optical disk under the directory of "'90.9.9" (indicated by reference character 146 in FIG. 14), today's date, which is the subordinate directory of the full-color image directory 136. At that time, the name of the file is created using the originator's name and the receiver's name, like, for example, "NO. 2 ABC (Co., Ltd) to XYZ (Co., Ltd.)", as mentioned above.

After recording has been completed, a binary mode file and a color mode file are created in step S123, as described in connection with FIG. 13. The created binary mode file is recorded under the same file name under the directory "'90.9.9", today's date, indicated by reference character 138, which is the subordinate directory of the binary mode transmission image directory 132. The created color mode file is recorded under the same file name under the directory "'90.9.9", today's date, indicated by reference character 140, which is the subordinate directory of the color mode transmission image directory 133. After recording has been completed, it is determined in step S124 whether another file image is to be input. If there is another file to be input, the process returns to step S121. If there is no more file to be input, the process proceeds to step S125, and it is determined whether another operation is to be performed. If there is another operation to be performed, the process returns to step S102. If there is no more operation to be performed, the magneto-optical disk is unloaded.

Figure 15E:
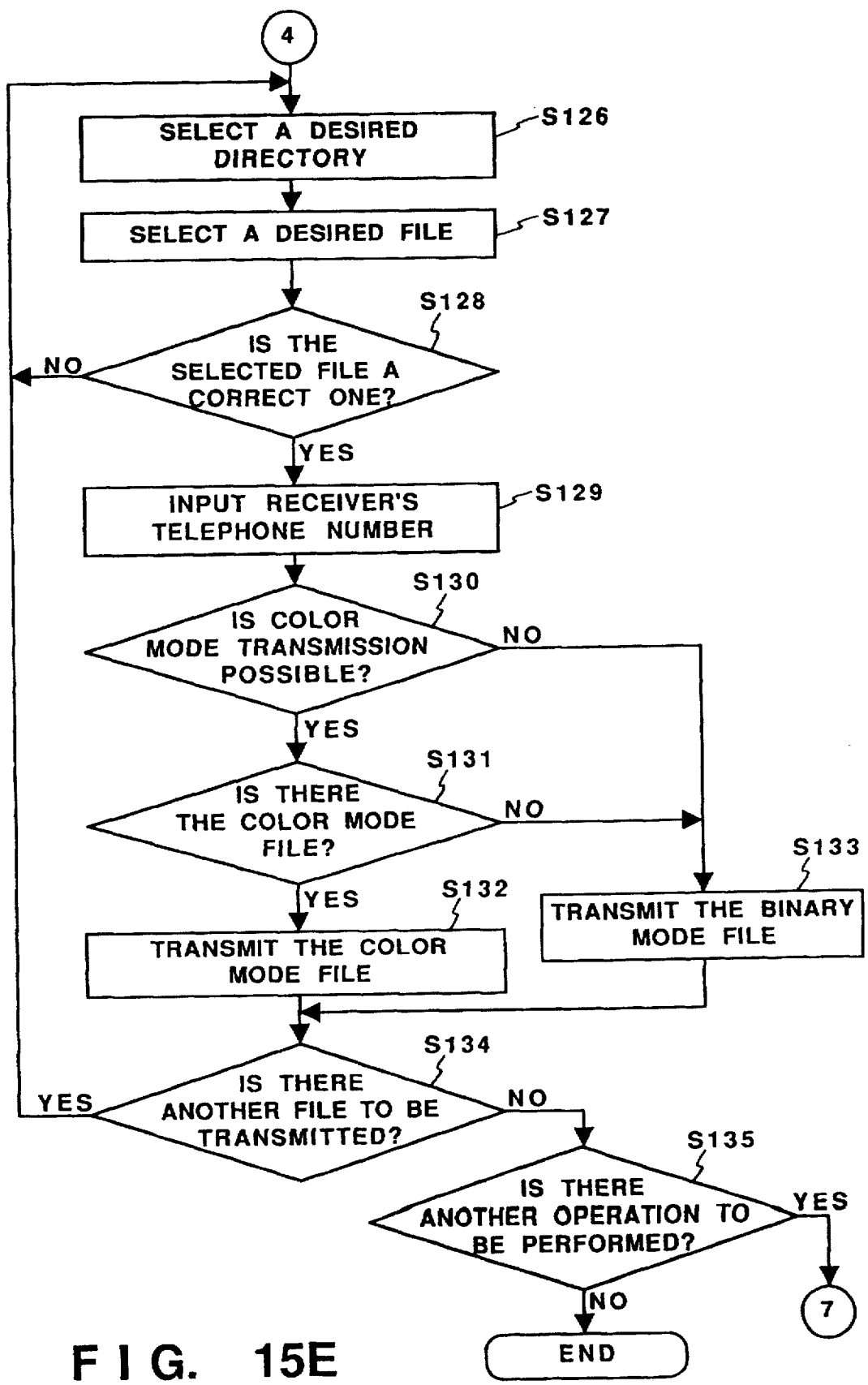

Next, the operation of facsimile image transmission will be described with reference to FIG. 15E.

When this operation is selected, the directory names which are subordinate directories of the binary mode transmission image directory 132 are read out and displayed on the display portion 11. In this embodiment, since dates are used as the directory names, "'90.9.8" (indicated by reference character 137), "'90.9.9" (indicated by reference character 138), . . . are displayed. In step S126, the directory under which the desired image file is stored is selected.

When a single directory has been selected, the names of the files stored under the selected directory are displayed on the display portion 11. In this embodiment, since originator's names and receiver's names are used as the file names, "NO. 1 ABC (Co., Ltd.) to XYZ (Co., Ltd.)" . . . are displayed. In step S127, the desired file name is selected. When the file name has been selected, part of the first page or demagnified image of that file is displayed on the display portion 11. It may be arranged such that a subsequent page is displayed when a special key is pressed.

In step S128, it is determined whether or not the operator has made the confirmation indicating that the displayed image is the designated one. If the displayed image is not the one the operator desired, the process returns to step S126 and the same operations are repeated. If the displayed image is the one that the operator desired, the process goes to step S129.

In step S129, the operator inputs the telephone number of the receiver. At that time, the originator's name and the receiver's name which are used as the originator's data may be altered. The input data is displayed on the display unit 11. After the displayed data has been checked, the telephone number is called to connect the remote facsimile machine to the telephone line.

When the telephone line has been connected, the receivable mode of the destination facsimile apparatus is checked in step S130. If color mode transmission is possible, the same file name as the selected one under the same directory as the selected one which is subordinate to the color mode transmission image directory 133 is searched for in step S131. If the same file name exists, the process goes to step S132 and that color mode file is reproduced and transmitted. If the color mode file having the same file name does not exist or if color mode transmission is impossible, the binary mode file is reproduced and transmitted in step S133.

When transmission has been completed, the process goes to step S134, and it is determined whether or not there is another file to be transmitted. If there is another file to be transmitted, the process returns to step S126. If there is no more file to be transmitted, the process goes to step S129, and it is determined whether or not there is another operation to be performed. If there is another operation to be performed, the process returns to step S102. If there is no more operation to be performed, the magneto-optical disk is unloaded, thereby completing the operation.

It is also possible to transmit the received image. That is achieved by designating the received image directory.

Figure 15F:
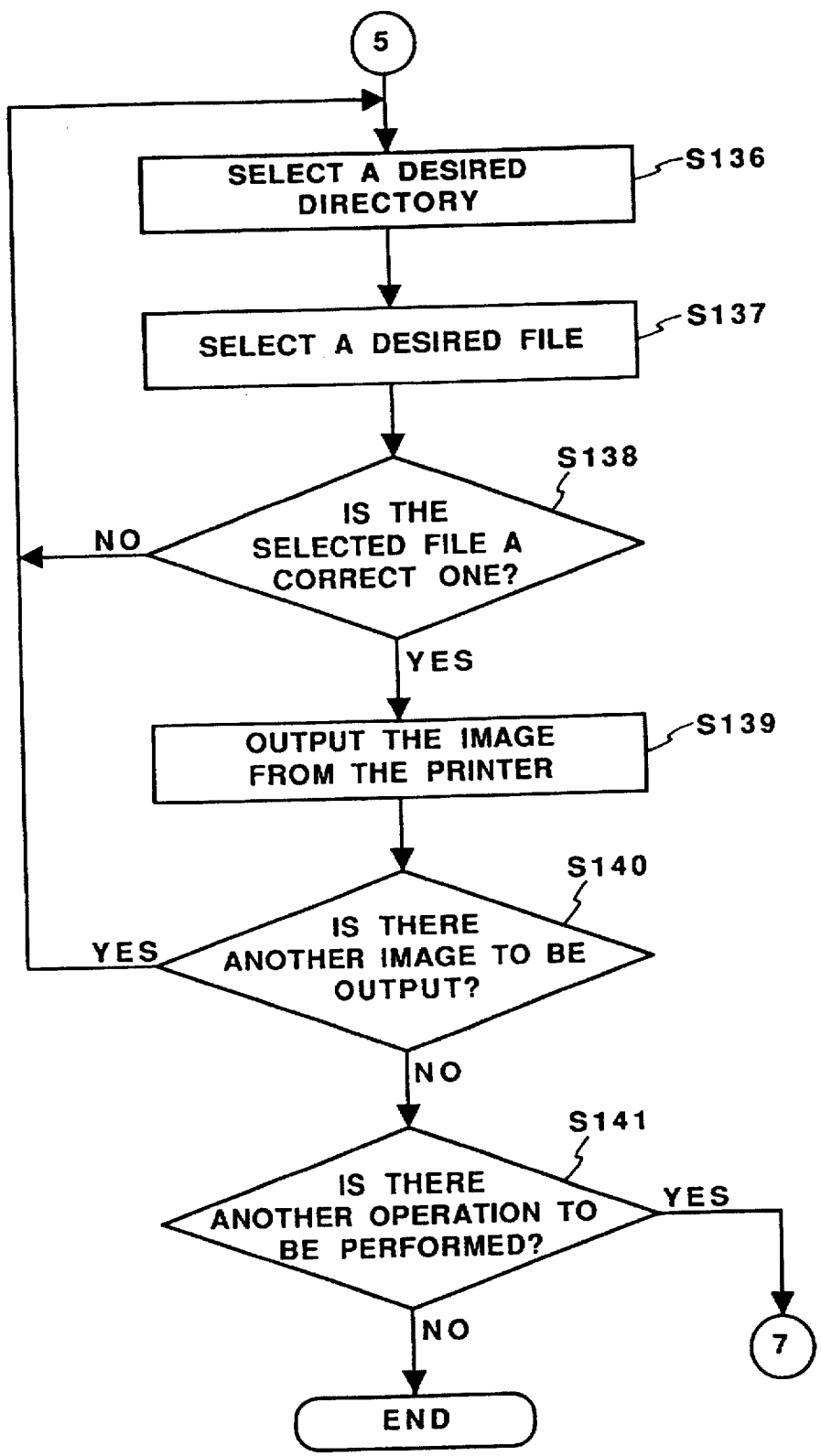

Next, the operation of outputting an image from the printer 72 in the facsimile apparatus will be described with reference to FIG. 15F.

When this operation has been selected, the directory names which are subordinate to the binary mode reception image directory 134 are read out and displayed on the display portion 11. When a single directory has been selected in step S136, the names of the files stored under the selected directory are displayed on the display portion 11. When the desired file name has been selected in step S137, part of the first page or demagnified image of that file is displayed on the display portion 11 in the same manner as that of the aforementioned case. In step S138, it is determined whether or not the operator has made the confirmation indicating that the displayed image is the designated one. If the displayed image is not the one the operator desired, the process returns to step S136 and the same operations are repeated. If the displayed image is the one that the operator desired, the process goes to step S139, and the binary mode file is reproduced and output from the printer unit 73. After the output has been completed, it is determined in step S140 whether or not there is another file to be output. If there is another file to be output, the process returns to step S136. If there is no more file to be output, the process goes to step S141.

In step S141, it is determined whether or not there is another operation to be performed. If there is another operation to be performed, the process returns to step S102. If there is no more operation to be performed, the magneto-optical disk is unloaded, thereby completing the operation. Printing out of the file in the binary mode reception image directory 134 has been described. It is, however, possible to print out the file in the binary mode transmission image directory 132. If it is desired to print out and check the image to be transmitted, the binary mode transmission directory is designated.

Figure 15G:
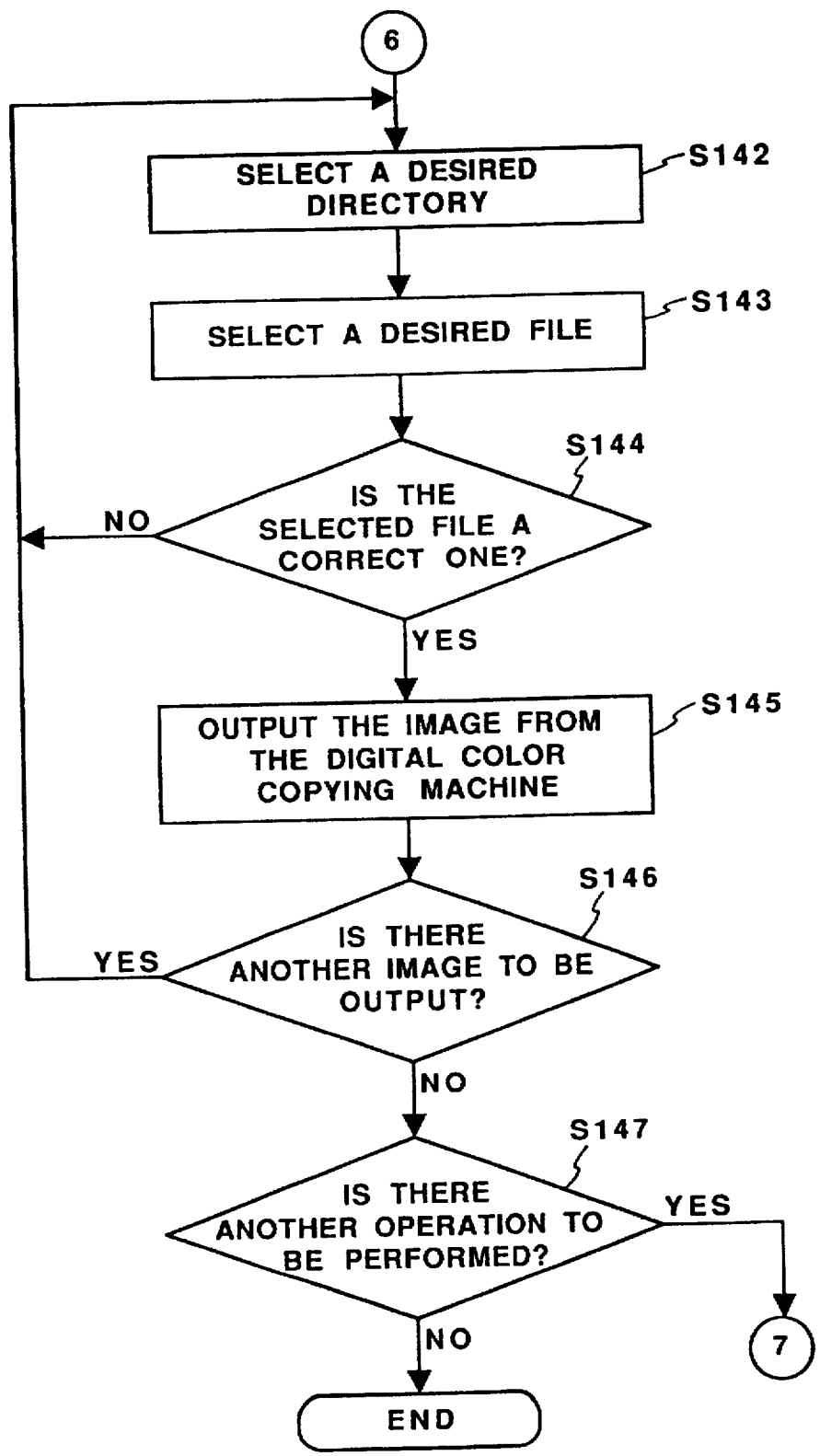

Next, the operation of outputting a full-color image from the printer of the digital color copying machine 50 will be described with reference to FIG. 15G. When this operation has been selected, the directories which are subordinate to the full-color image directory 136 in the magneto-optical disk are read out and displayed on the display portion 11.

When the desired directory has been selected in step S142, the file names under the selected directory are read out and displayed on the display portion 11.

When the desired file name has been selected in step S143, the first page of that file is converted into a binary mode image and part thereof or demagnified image thereof is displayed on the display portion 11. At that time, the converted image is temporarily stored in the magneto-optical disk as a buffer.

In step S144, it is determined whether or not the displayed image is the designated one. If the displayed image is not the one the desired one, the process returns to step S142 and the same operations are repeated. If the displayed image is the desired one, the process goes to step S145, and the full-color image file is reproduced and output from the printer of the digital color copying machine. After the output has been completed, it is determined in step S146 whether or not there is another file to be output. If there is another file to be output, the process returns to step S142. If there is no more file to be output, the process goes to step S147.

In step S147, it is determined whether or not there is another operation to be performed. If there is another operation to be performed, the process returns to step S102. If there is no more operation to be performed, the magneto-optical disk is unloaded, thereby completing the operation.

As will be understood from the foregoing description, the facsimile apparatus of the present invention incorporates the portable memory medium, and includes means for recording the image read by the scanner in the facsimile apparatus in the memory medium as a facsimile image file, means for recording the received facsimile image into the memory medium as a facsimile image file, means for reproducing the facsimile image file recorded in the memory medium and for outputting the reproduced file to the printer in the facsimile apparatus as an image, and means for reproducing the facsimile image file recorded in the memory medium and for transmitting the reproduced file as a facsimile image. Consequently, the transmitted and received images can be recorded in the portable memory medium and can thus be stored without requiring storage space.

Furthermore, the facsimile apparatus incorporates the portable memory medium, and includes means for recording the full-color image file read by the scanner provided outside of the facsimile apparatus to read full-color images in the memory medium, means for converting the full-color image file into a facsimile image file and for transmitting the facsimile image, means for converting a facsimile image file and for recording the resultant full-color image file in the memory medium, and means for reproducing a full-color image file from the memory medium and for outputting the reproduced full-color image from the printer provided outside of the facsimile apparatus to output full-color images. Consequently, input and output of facsimile images can be performed independently of the size of the recording paper. Furthermore, transmission and reception of color images can be performed.

Figure 9:
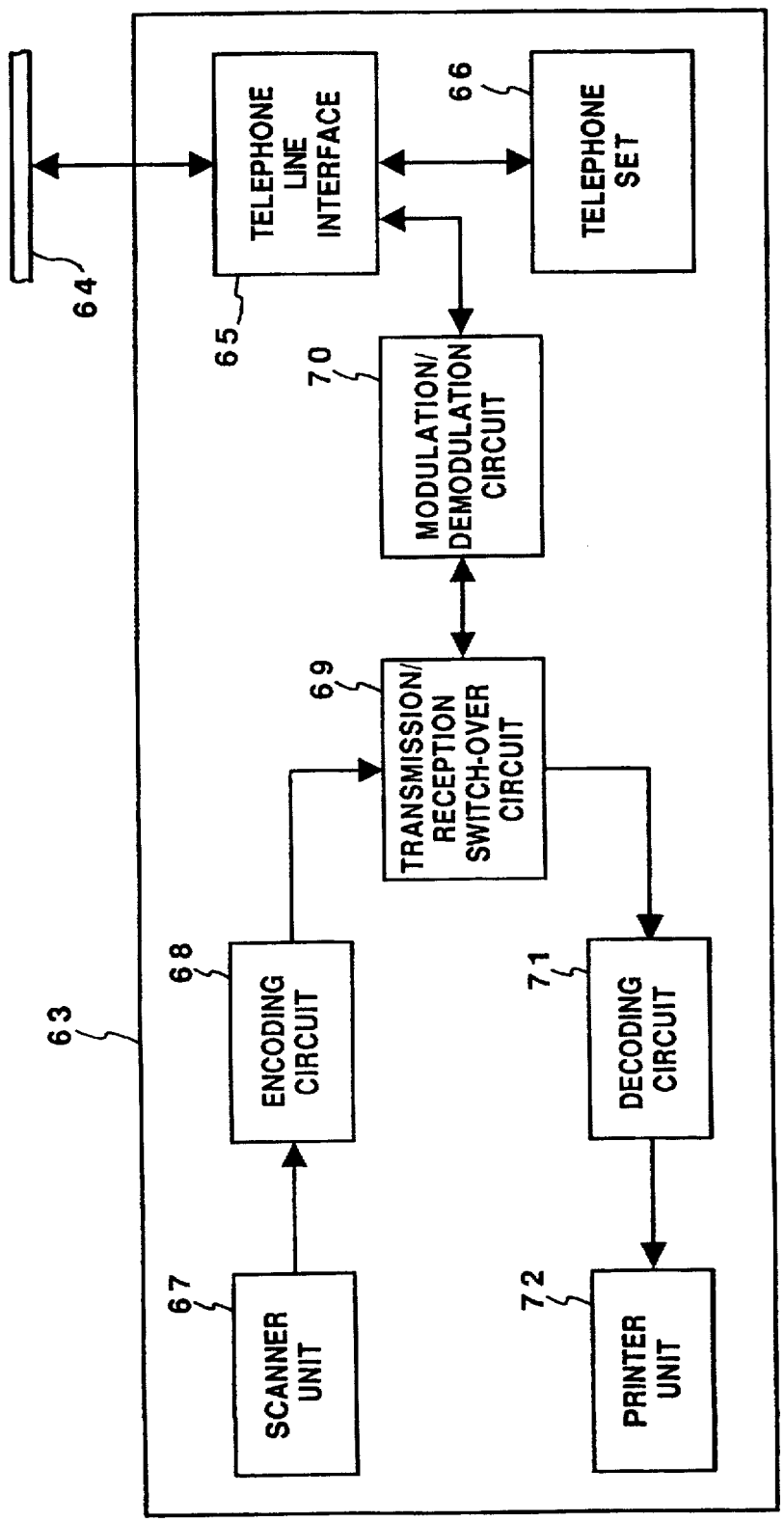
FIG. 9 is a diagrammatic view of a conventional facsimile apparatus.
Figure 11:
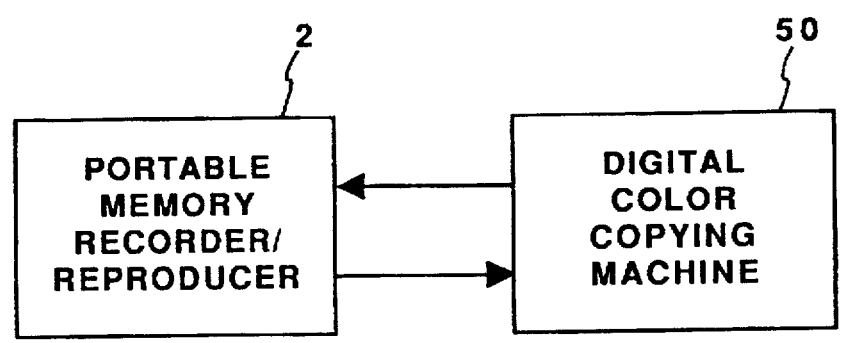
FIG. 11 illustrates an example of connection of a portable memory recorder/reproducer to a digital color copying machine in the second embodiment.

In the second embodiment, the facsimile apparatus incorporates the scanner unit 67 and the printer unit 72, like the conventional facsimile apparatus shown in FIG. 9. However, it may be constructed in the manner shown in, for example, FIG. 16.

Figure 16:
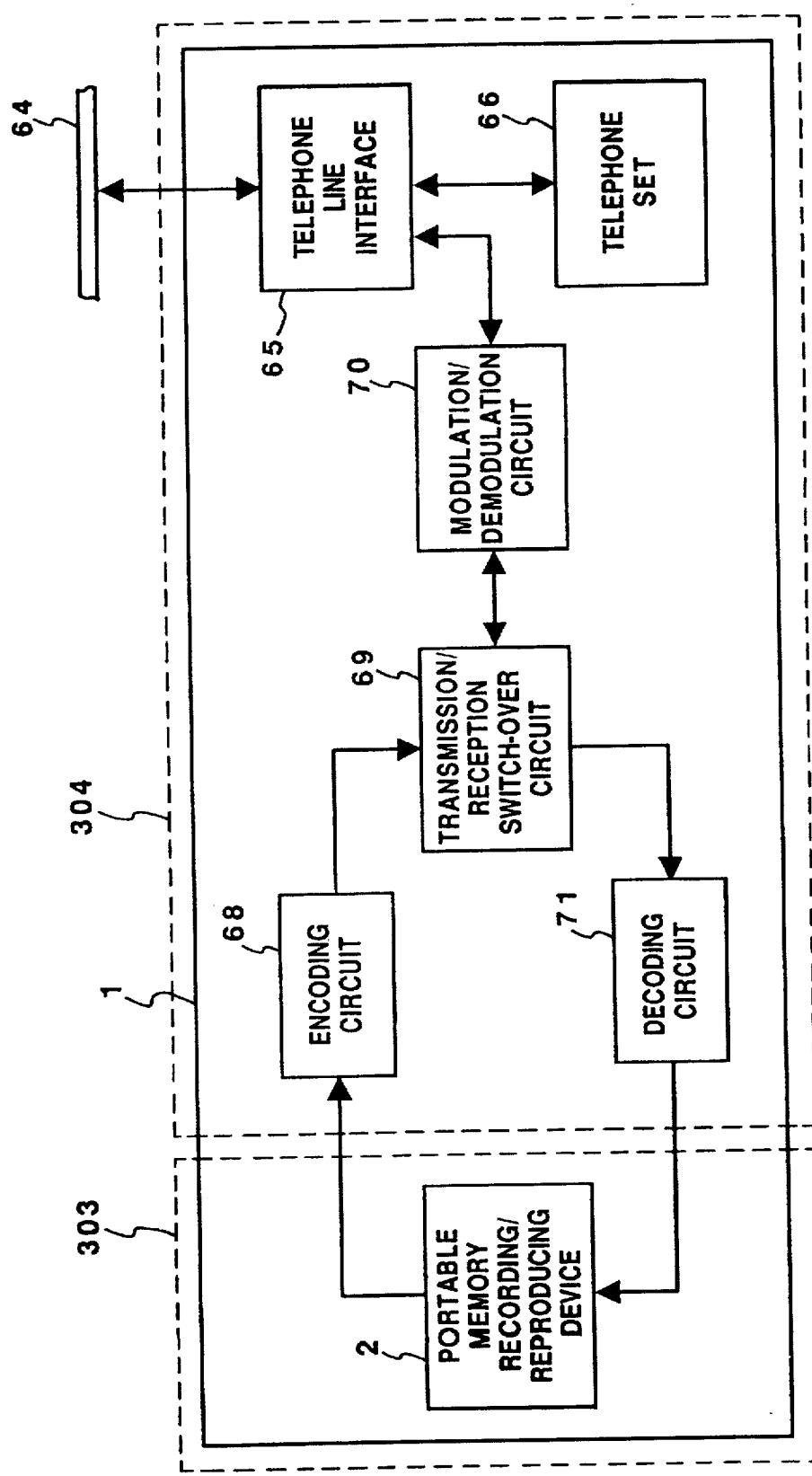
FIG. 16 is a diagrammatic view of a facsimile apparatus according to a third embodiment of the present invention.

In FIG. 16, reference numeral 62 denotes a facsimile apparatus. The facsimile apparatus 62 incorporates neither scanner unit nor printer unit and input and output of all the images are performed by the digital color copying machine through the portable memory medium.

Also, the portable memory recorder/reproducer 2 has been described as being able to be connected to both the facsimile apparatus and the digital color copying machine. However, the portable memory recorder/reproducer 2 may be provided in each of the facsimile apparatus and the digital color copying machine.

The facsimile apparatus made up of different apparatuses has been described. However, it is also possible to provide a facsimile apparatus which incorporates different functions.

In the above description, the processings related to the flowchart of FIG. 15 have been controlled by the CPU in the portable memory recorder/reproducer. However, they may be performed by a CPU (not shown) in the facsimile apparatus body.

According to the second embodiment of the present invention, storage of images for communications are facilitated and output of images through a desired output route is made possible.

A third embodiment of the present invention will be described below.

Figure 17:
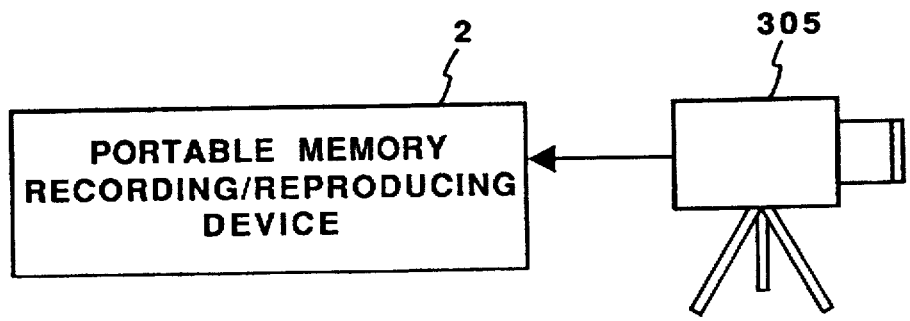
FIG. 17 illustrates how image data is input to the facsimile apparatus of the third embodiment.

FIG. 16 is a block diagram of a third embodiment of a facsimile apparatus according to the present invention. FIG. 17 illustrates input of images to and output of images from the facsimile apparatus according to the third embodiment of the present invention.

In FIG. 16, reference numeral 1 denotes a facsimile apparatus. Reference characters 64 through 66 and 68 through 71 denote parts which are the same as those described in the conventional apparatus, description thereof being omitted.

Reference character 2 denotes a portable memory recording/reproducing device (hereinafter referred to as a recording/reproducing device) which stores full-color still image files. The full-color still image files are stored in the form of both facsimile files (color mode files) for the third embodiment and conventional facsimile files (binary mode files), respectively.

When an image signal is to be transmitted, connection to the telephone line 64 is made, and then the image file to be transmitted to a remote facsimile apparatus is fed to the encoding circuit 68 from the portable memory recording/reproducing device 2. The signal which is output from the recording/reproducing device 2 at that time corresponds to the image signal which is output from the scanner portion 67 of the conventional facsimile apparatus. The image signal which has been output from the recording/reproducing device 2 is processed, e.g., compressed, by the encoding circuit 68. The resultant signal is fed through the transmission/reception switch-over circuit 69 to the modulation/demodulation circuit and is modulated. The modulated signal is transmitted to the remote apparatus through the telephone line interface 65. As shown in FIG. 17, a video signal from a video camera 305 can be directly stored by the recording/reproducing device.

Figure 18:
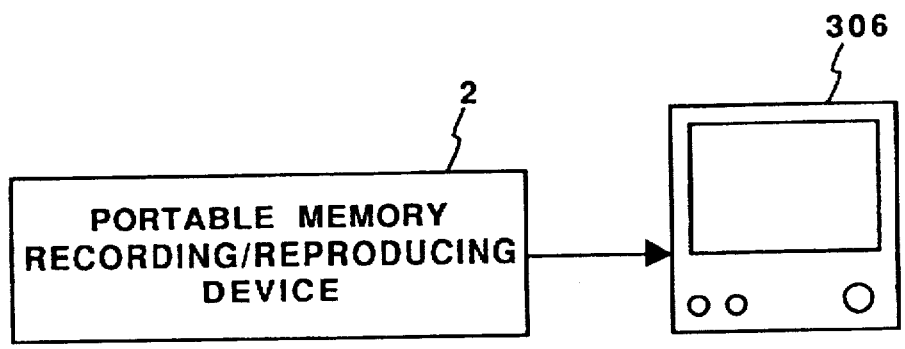
FIG. 18 illustrates how image data is output from the facsimile apparatus of the third embodiment.

When a facsimile image is to be received, the modulated signal arriving from the remote apparatus via the telephone line is fed through the telephone line interface 65 to the modulation/demodulation circuit 70 and is demodulated. The demodulated image signal is fed through the transmission-reception switch-over circuit 69 to the decoding circuit 71 and is expanded to obtain an original image. The decoded image signal is output to and stored in the portable memory recording/reproducing device 2. This image signal corresponds to the signal output to the printer unit 72 of the conventional apparatus. The image files stored in the recording/reproducing device 2 are either the facsimile image files (color mode files) of this embodiment or the conventional facsimile image files (binary mode files). The received images are converted into video signals and the converted video signals are stored. Therefore, they can be monitored on a TV monitor 306, as shown in FIG. 18.

The facsimile apparatus of this embodiment may also be arranged such that a separation type portable memory recording/reproducing device 303 and a telephone set 304 having a facsimile transmission/reception function are connected to each other, as shown in FIG. 16.

FIG. 19 is an external view of a separation type facsimile apparatus of this embodiment in which the memory recording/reproducing device 303 and the telephone set 304 having the facsimile transmission/reception function are detachably connected to each other.

In FIG. 19, the separation type portable memory recording/reproducing device 303 has a recording medium which may be a magneto-optical disk memory 307. The magneto-optical disk 307 can be loaded and unloaded through an insertion port 308. An operation panel 309 has ten keys used for inputting telephone numbers or the like, alphabet keys and function keys pressed when various functions are executed. A display unit 310 displays the transmission destination telephone number, the operation procedures or a list of file names. The telephone 304 having the facsimile transmission/reception function, the video camera 305 and the TV monitor 306 can be connected to the portable memory recording/reproducing device 303 through an input/output terminal 311.

Figure 20:
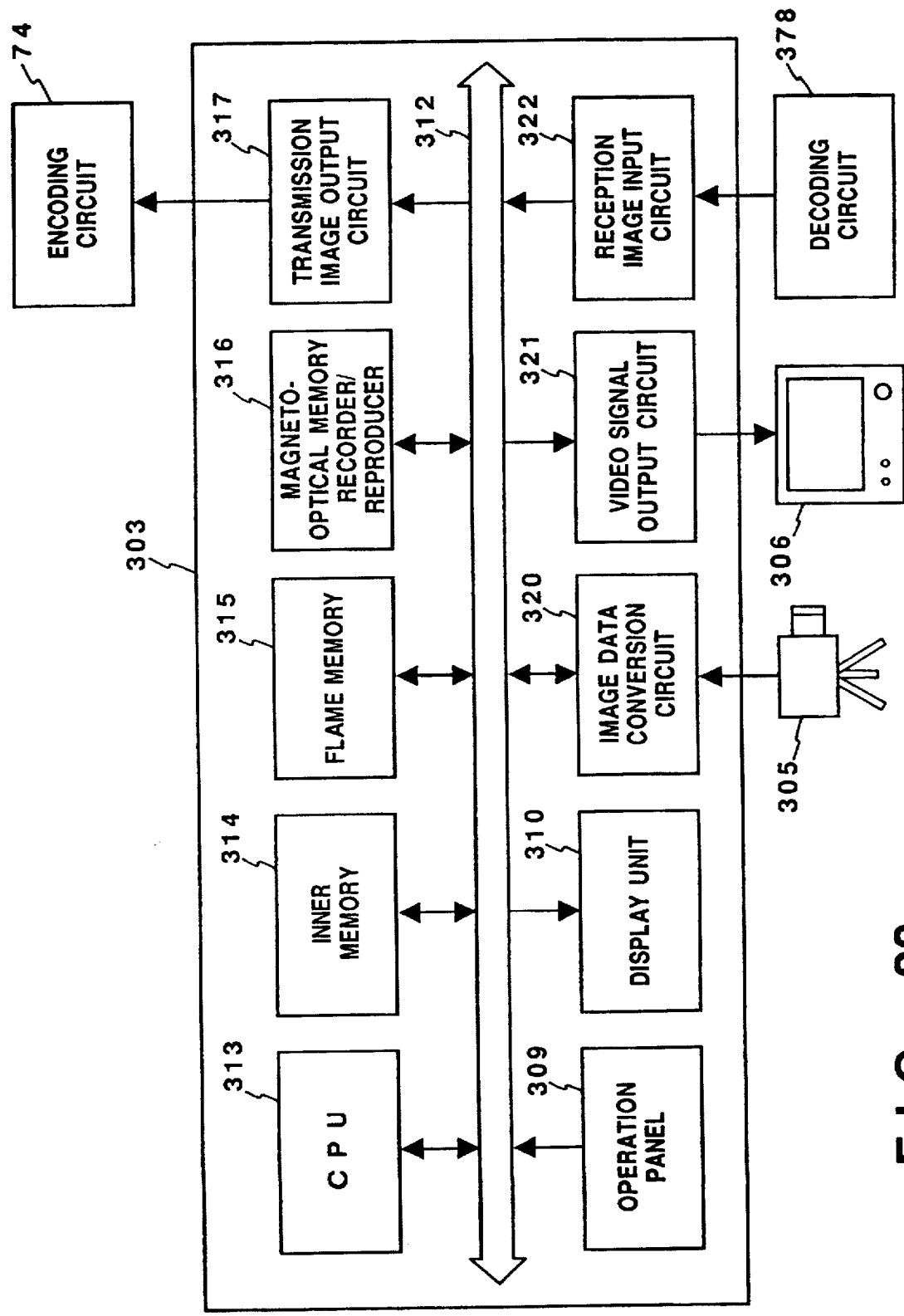
FIG. 20 is a diagrammatic view of a portable memory recorder/reproducer used in the facsimile apparatus of the third embodiment.

FIG. 20 is a block diagram of the portable memory recording/reproducing device 303.

In FIG. 20, data is fed within the portable memory recording/reproducing device 303 through a bus 312. A CPU 313 controls the entirety of the portable memory recording/reproducing device 303 on the basis of the control programs stored in an internal memory 314. The internal memory 314 is provided with a ROM and a RAM which are used to control the portable memory recording/reproducing device 303. A frame memory 315 stores the images input from the video camera 305 or images output to the TV monitor 306.

A recorder/reproducer 316 stores image data in or reproduces image data from the magneto-optical disk memory 307 which is the portable memory medium. A transmission image output circuit 317 outputs image signals to the encoding circuit 68 in the telephone 305 having the facsimile transmission/reception function. Reference numerals 309 and 310 denote an operation panel and a display unit, respectively. An image data converting circuit 320 converts the images input from the video camera 305 into digital full-color image files. The image data 20 converting circuit 320 can also convert the full-color image files into binary mode files that can be transmitted to a conventional facsimile apparatus or into color mode files which can be transmitted to a facsimile apparatus of the same type as that of the third embodiment. The image data converting circuit 320 can also convert received binary mode files and color mode files into full-color image files. A video signal output circuit 321 outputs images to the TV monitor 306. A received image input circuit 322 inputs facsimile images from a decoding circuit 378 of the telephone set 304 having the facsimile transmission/reception function.

Figure 21:
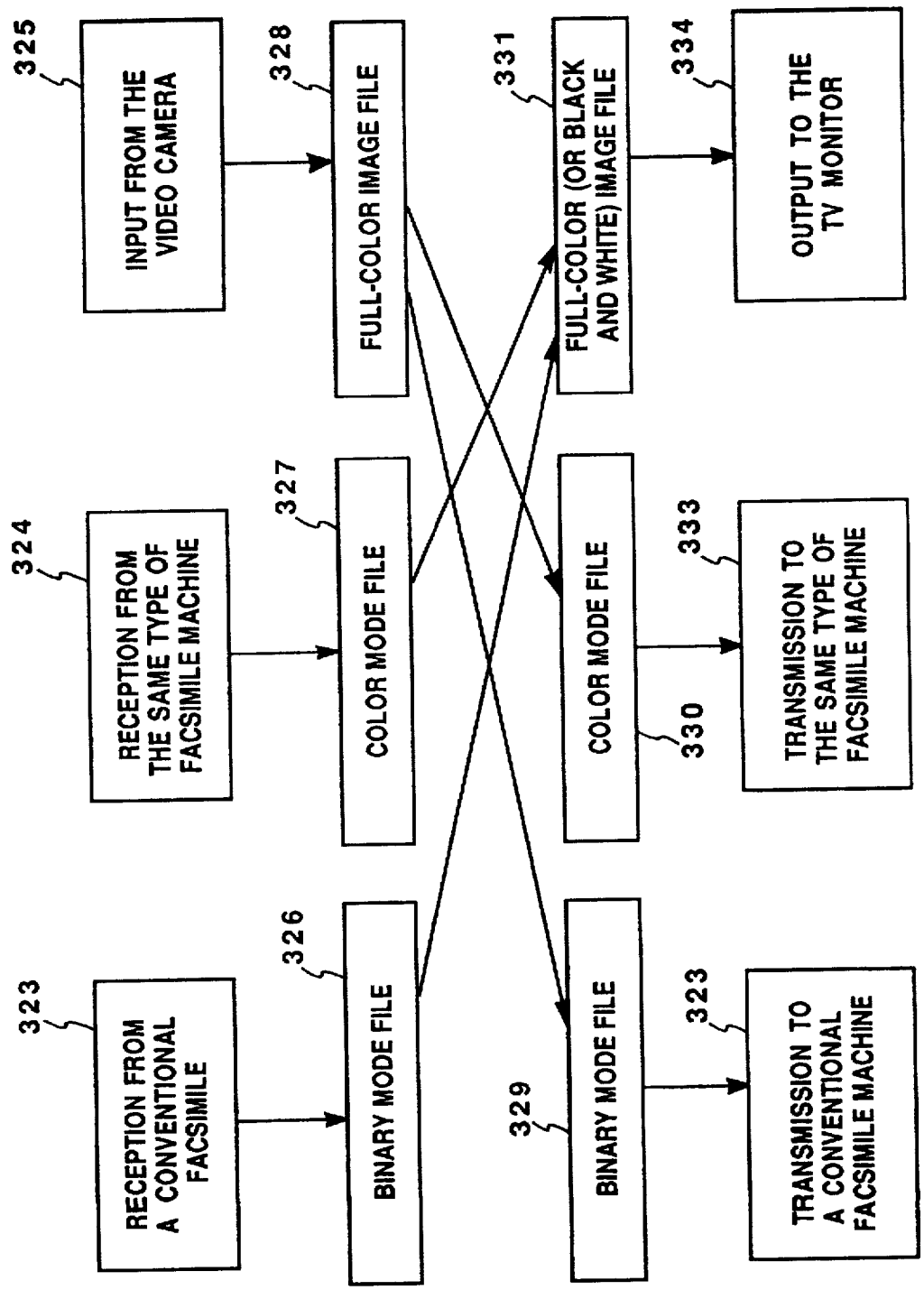
FIG. 21 illustrates how file conversion is conducted on the image data by the facsimile apparatus of the third embodiment.

FIG. 21 shows the types of image files which are input to the portable memory recording/reproducing device 303 of the third embodiment, and how such image files are converted by the image data converting circuit 320.

Assuming that a facsimile original document image has a A4 size (210 mm×297 mm), and that the resolution thereof is 8 pixels/mm×7.7 scanning lines/mm, the total number of pixels of that original image is 1680×2287. The conventional facsimile images are binary images. These are called binary mode files. In the binary mode file, the capacity of a single A4 size page is about 500k bytes.

Assuming that the color image input from the video camera 305 is stored as a full-color image file, the input image signal is A/D converted to obtain full-color image data in which each of R, G and B has 8 bits. In this embodiment, the video signal is of the NTSC method. The number of scanning lines of an image which is input is 500. The number of samplings on a single scanning line is set to about 640 with the aspect ratio 3:4 and the aspect ratio of a facsimile image 7.7:8 taken into consideration (In the case of the high-definition method, the number of scanning line of the input image is 1000, and the number of samplings is 1770 lines/scanning line. Hereinafter, the NTSC method will be described). Thus, the full-color image file for a single screen requires a capacity of less than 1 M bytes, in the case of the NTSC method.

In FIG. 21, when an image signal 323 of A4 size arrives from a conventional facsimile apparatus, it is received by the received image input circuit 322. The received image signal is stored in the recorder/reproducer 316 as a binary mode file 326. At the same time, the binary mode file 326 is converted into a full-color image file by the image data converting circuit 320, and the converted file is also stored in the recorder/reproducer 316. A binary mode file is stored as a reduced black and white image file having, for example, 560×770 pixels which are about ⅓ of 1680×2287 pixels.

When the image data converting circuit 320 converts the binary mode file 326 into a full-color image file, one pixel may be expressed in three bytes of R, G and B. Alternatively, one pixel may be expressed in one byte. When such a file is output to the TV monitor 306, the same data is output in each of R, G and B. In this embodiment, one pixel is expressed by three bytes of R, G and B. The capacity of the full-color image file 331 of A4 size obtained in the manner described above is about 1.3 M bytes.

Figure 22:
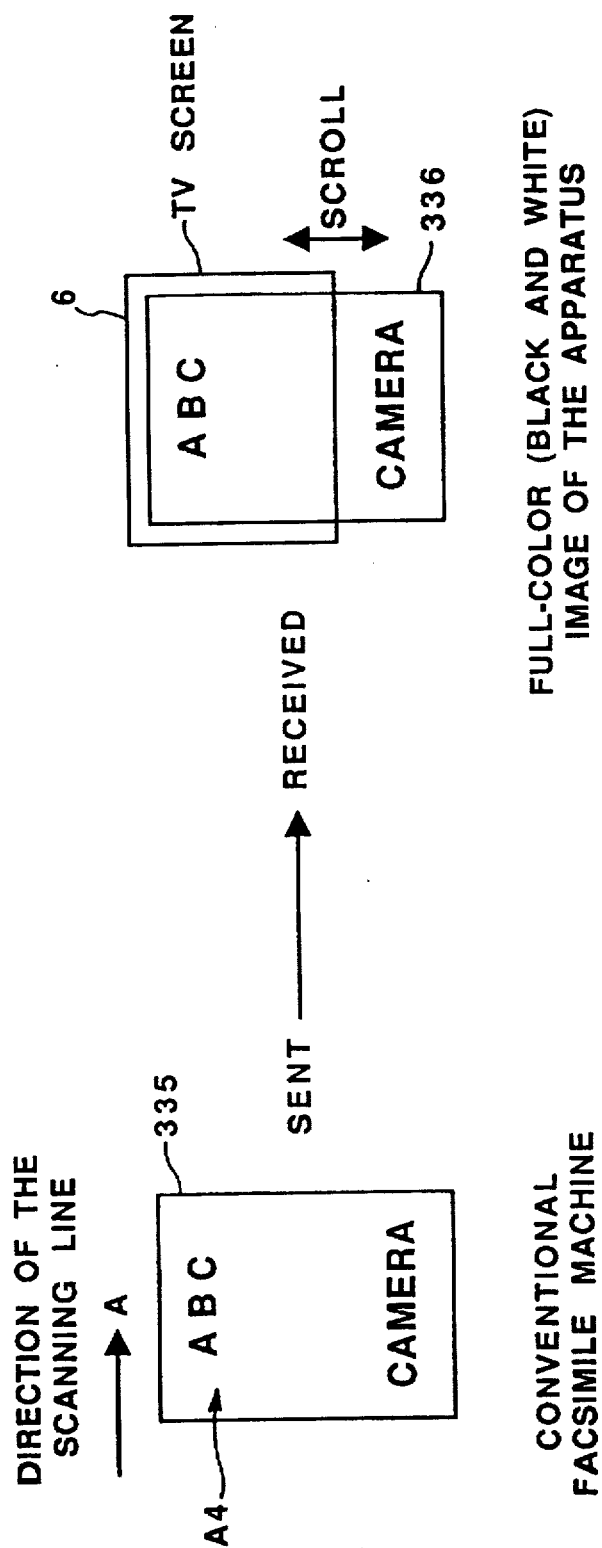
FIG. 22 illustrates how an image transmitted from a conventional facsimile apparatus is received by the facsimile apparatus of the third embodiment.
Figure 23:
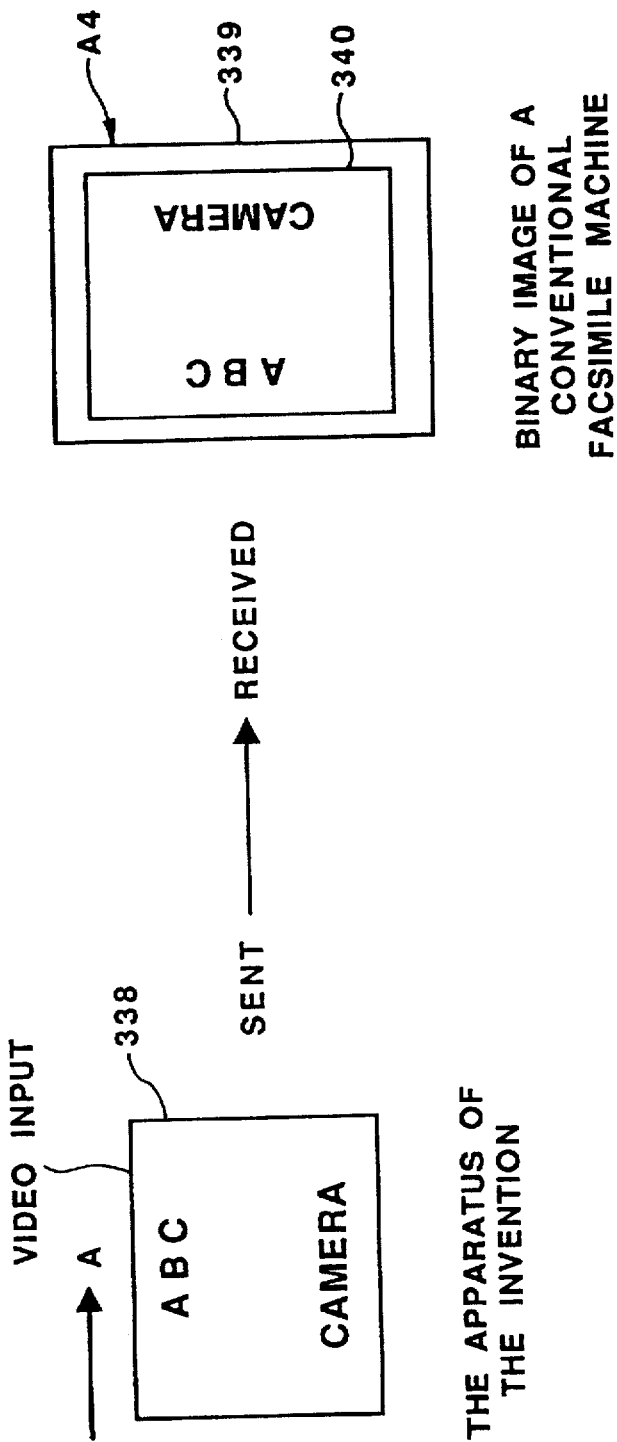
FIG. 23 illustrates how the image transmitted from the facsimile apparatus of the third embodiment is received by the conventional facsimile apparatus.
Figure 24:
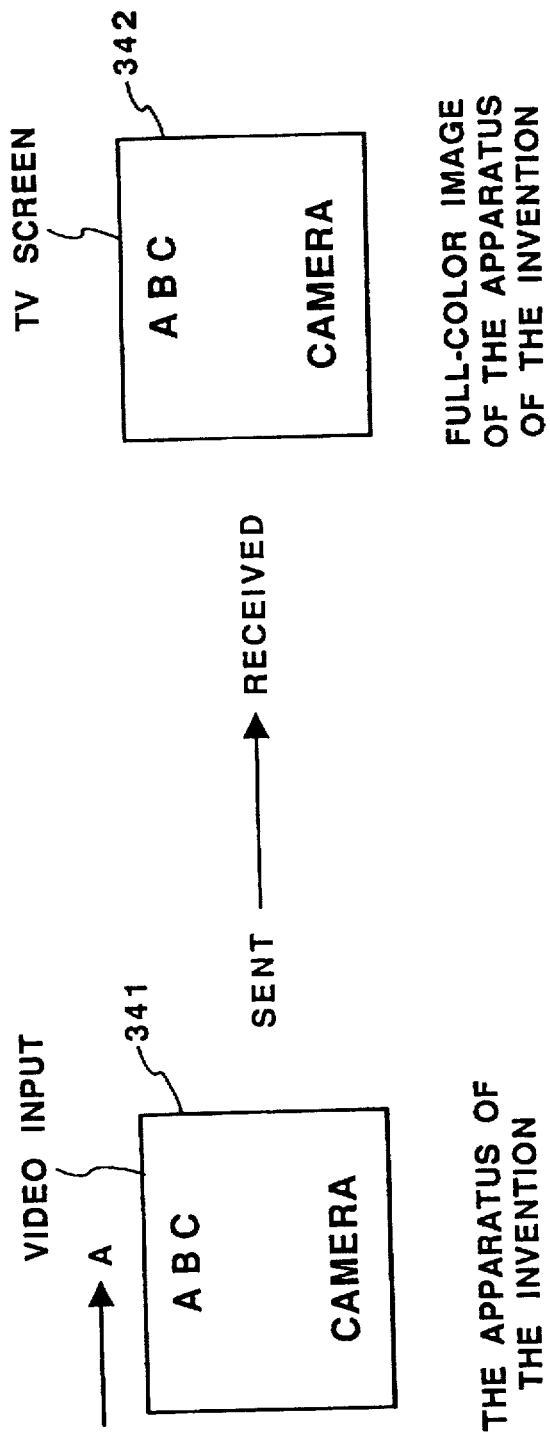
FIG. 24 illustrates how a full-color image transmitted from the facsimile apparatus of the third embodiment is received by the facsimile apparatus of the third embodiment.

The full-color image file 331 is stored in the frame memory 315 and is displayed on the TV monitor 306, as shown in FIG. 22. In that case, an image of A4 size, denoted by reference numeral 335, is displayed on a screen of the TV monitor 306 in the manner denoted by reference numeral 336. The entirety of the image 335 can be viewed by scrolling the screen. In FIG. 22, a direction indicated by an arrow A is the direction of the scanning line of the facsimile apparatus and TV monitor 306. In FIGS. 23 and 24, a direction indicated by an arrow A is the direction of the scanning line, as in the case shown in FIG. 22.

When a full-color image is input from the video camera 305, it is stored in the magneto-optical disk 307 as a full-color image file 328 and is then converted into both a binary mode file 329 and a color mode file 330 by the image data converting circuit 320. Both files 329 and 330 are stored in the magneto-optical disk 307. When the full-color image file 328 is converted into the binary mode file 329, a video input image denoted by reference character 338 in FIG. 23 is expanded as an image 340 in an area 339 of A4 size. That is, the data having full-color 640×500 pixels is converted into image data having 1500×1920 pixels by increasing the number of pixels by a factor of 3 and by replacing the horizontal direction with the vertical direction. The resultant image data is then converted into binary data, and dummy data is added to the periphery of the binary image to obtain the binary image file 329 of 1680×2287 pixels. The capacity of this binary image data is about 500k bytes per image.

When the full-color image input from the video camera 305 is converted into the color mode file 330, it is similarly converted into image data having 1500×1920 pixels by increasing the full-color 640×500 pixels by a factor of 3 and by replacing the horizontal direction with the vertical direction. Thereafter, the image data is decomposed into R, G and B files, and the decomposed each color component file in which one pixel has 8 bits is further decomposed into 8 files according to the bit to obtain pseudo binary data. Dummy data is added to the periphery of each image data to obtain a color mode file 330 having 1680×2287 pixels. That is, one full-color screen is converted into one color mode file 330 consisting of 24 pseudo binary mode files {3 (RGB)×8 (8 bits)=24}. The capacity of the image data file 330 is about 12 M bytes per image.

When the remote facsimile apparatus is a conventional facsimile apparatus indicated by reference character 332 in FIG. 21, the binary mode file 329 is transmitted. In the conventional facsimile apparatus, the transmitted file 329 is printed out on the paper 339 of A4 size, as shown in FIG. 23.

When the remote facsimile apparatus is of the type of this embodiment, the color mode file 330 is transmitted, as indicated by reference character 333 in FIG. 21.

Next, the case in which a color mode file 327 is received from the facsimile apparatus of the type of this embodiment, as indicated by reference character 324 in FIG. 21, will be described.

After a color mode file 327 arriving in the form of 24 pseudo binary mode files per screen has been stored in the recorder/reproducer, dummy data is removed. Thereafter, image data of bit0 to bit7 is synthesized for each color component. The obtained image data is converted into original full-color image data of 640×500 pixels by replacing the horizontal direction with the vertical direction and then by decreasing the number of pixels by a factor of 3. The resultant full-color image file 331 is stored in the magneto-optical disk 307. FIG. 24 shows how such a file 331 is displayed. A video input screen indicated by 341 is displayed on the TV monitor 306, as shown in FIG. 342.

In the third embodiment, since data is stored in the magneto-optical disk 307 in the same state as that of the second embodiment, shown in FIG. 14, description thereof is omitted.

The operation of the facsimile apparatus according to the third embodiment will now be described with reference to FIG. 25. The control programs for executing the following process are stored in the inner memory 314.

Figure 25A:
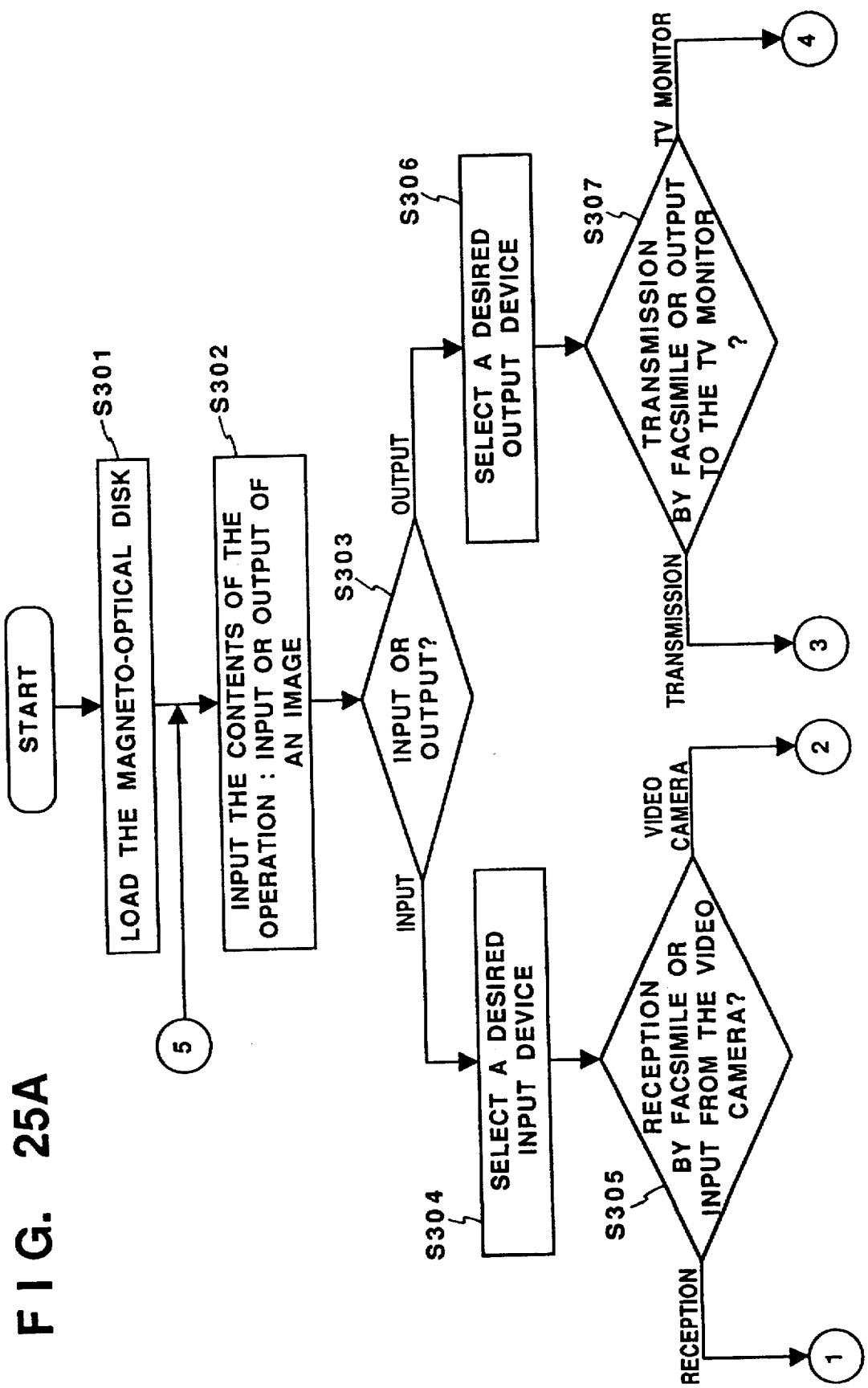
FIGS. 25A to 25E are flowcharts showing the input/output and transmission/reception of image signals of the facsimile apparatus of the third embodiment.

Referring first to FIG. 25A, in step S301, the magneto-optical disk 307 is loaded in the portable memory recording/reproducing device 2. The capacity of a full-color image file for transmission is about 1 M byte per screen. The capacity of a binary mode file for transmission is about 500k bytes per screen. The capacity of a color mode file for transmission is about 12 M bytes per screen. Therefore, the total capacity of these images is about 13.5 M bytes. Thus, if the capacity of the magneto-optical disk is 600 M bytes, about 40 screens can be stored in it.

In the case of a received image, the capacity of a binary mode file is about 500k bytes per screen. The capacity of a full-color image file is about 1.3 M bytes per screen. If the received image is a binary mode file, since the binary mode file requires a total capacity of 1.8 M bytes, about 330 screens can be stored in the magneto-optical disk 307. The capacity of a color mode file per screen is about 12 M bytes. The capacity of a full-color image file per screen is about 1.3 M bytes. Thus, if the received image is a color mode file, since the total capacity thereof is about 13.3 M bytes, about 40 screens can be stored in the disk 307. Of course, if these image files are stored at the same time, the number of screens that can be stored decreases accordingly. Although it has been described that binary mode and color mode files are stored in addition to a full-color image, the binary mode and color mode files may be erased when file conversion or transmission is completed. In this way, the number of screens that can be stored can be increased. In that case, about 400 screens can be stored.

After the magneto-optical disk 307 has been loaded, input of the operation instruction, such as image transmission, is awaited. To input the operation contents, a plurality of special input buttons may be provided on the operation panel 309. The user inputs the operation contents by depressing one of the buttons. Alternatively, a display portion 310 may display numbers and corresponding operation contents. The user designates a desired operation by inputting the corresponding number. Hereinafter, the designation operation is conducted by the user under the same principle. The operation contents may include input, output, copying of erasure of image. However, only input and output of images will be described below.

Figure 25B:
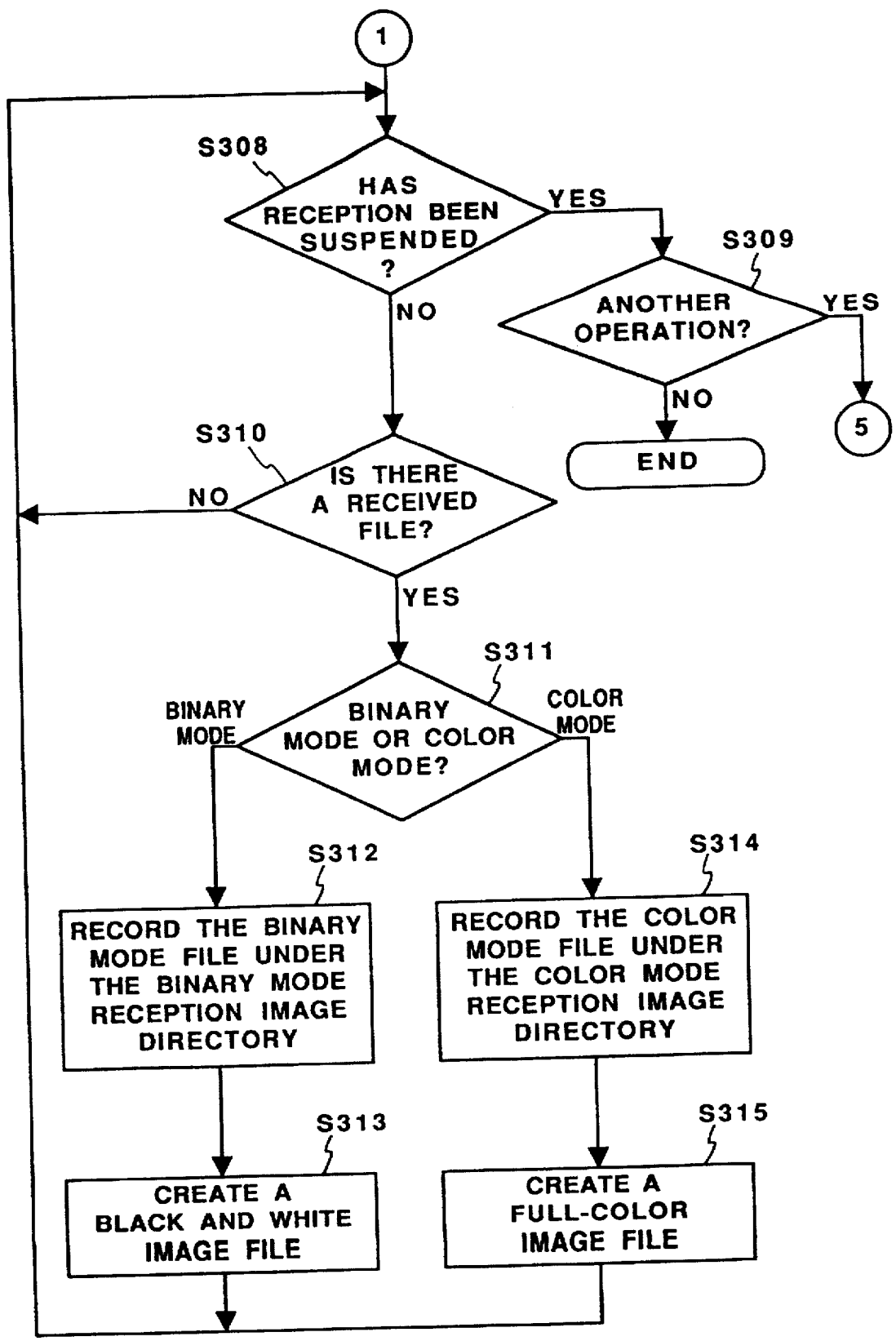
Figure 25C:
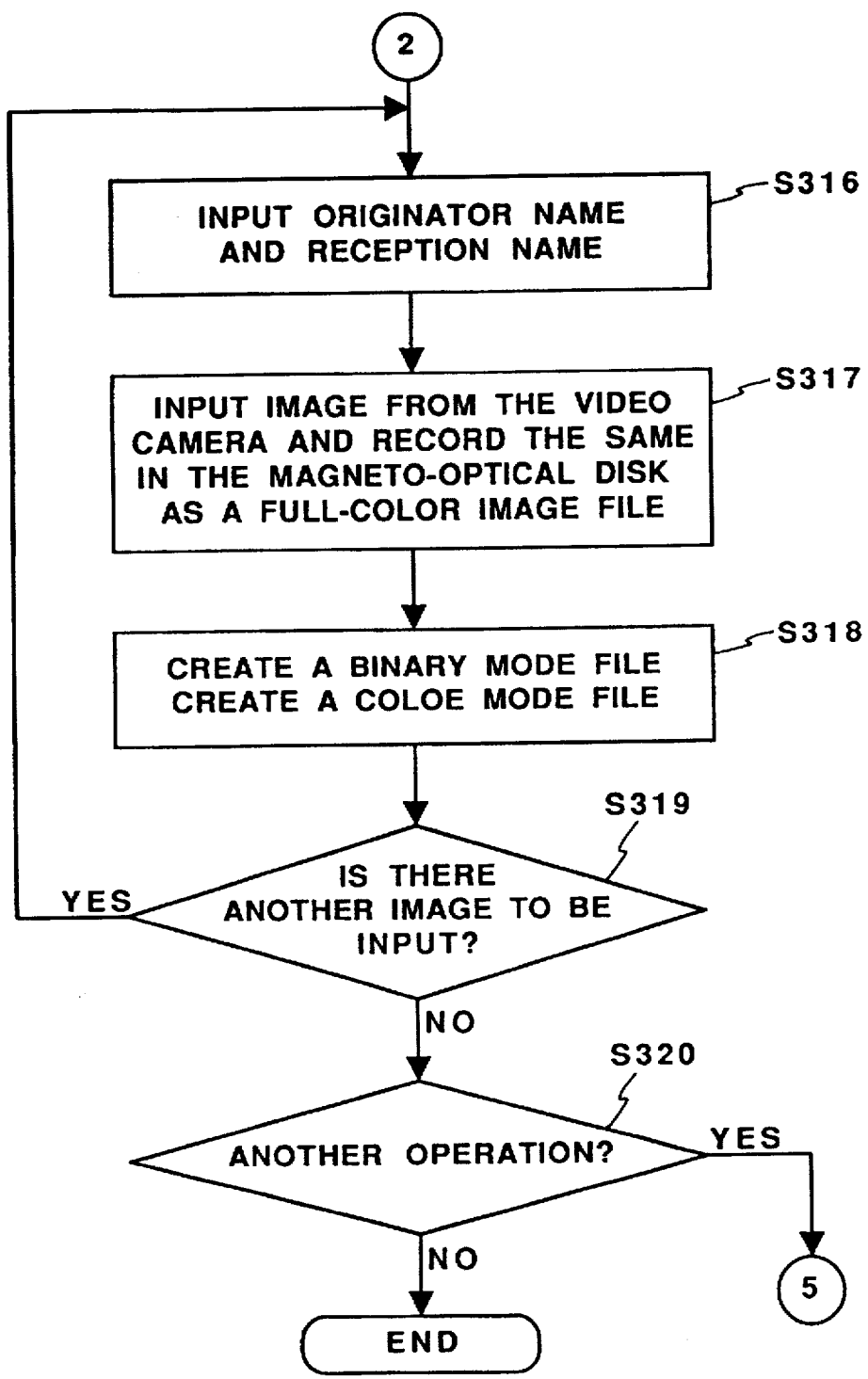

In steps S303, the designated contents which are input from the operation panel 309 are determined. If input of an image is designated, the process goes to step S304. If output is designated, the process goes to step S306. In step S304, selection of the input device is made, that is, it is determined whether a facsimile image is received or an image signal is input from the video camera 305. In step S305, the contents of the selection are determined, and if a facsimile image is to be received, the process goes to step S308 (FIG. 25B). If an image is to be input from the video camera 305, the process proceeds to step S316 (FIG. 25C).

Figure 25D:
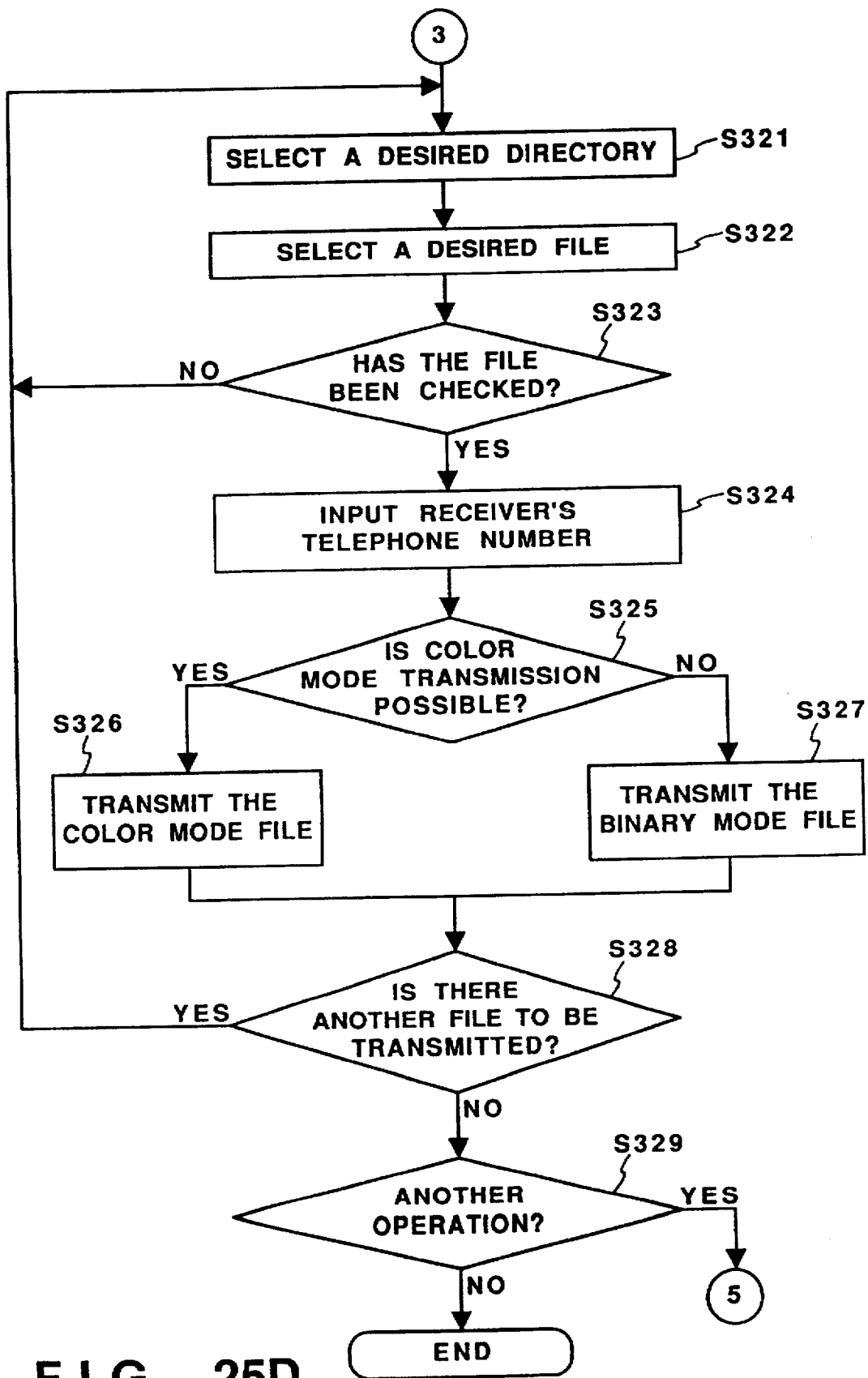
Figure 25E:
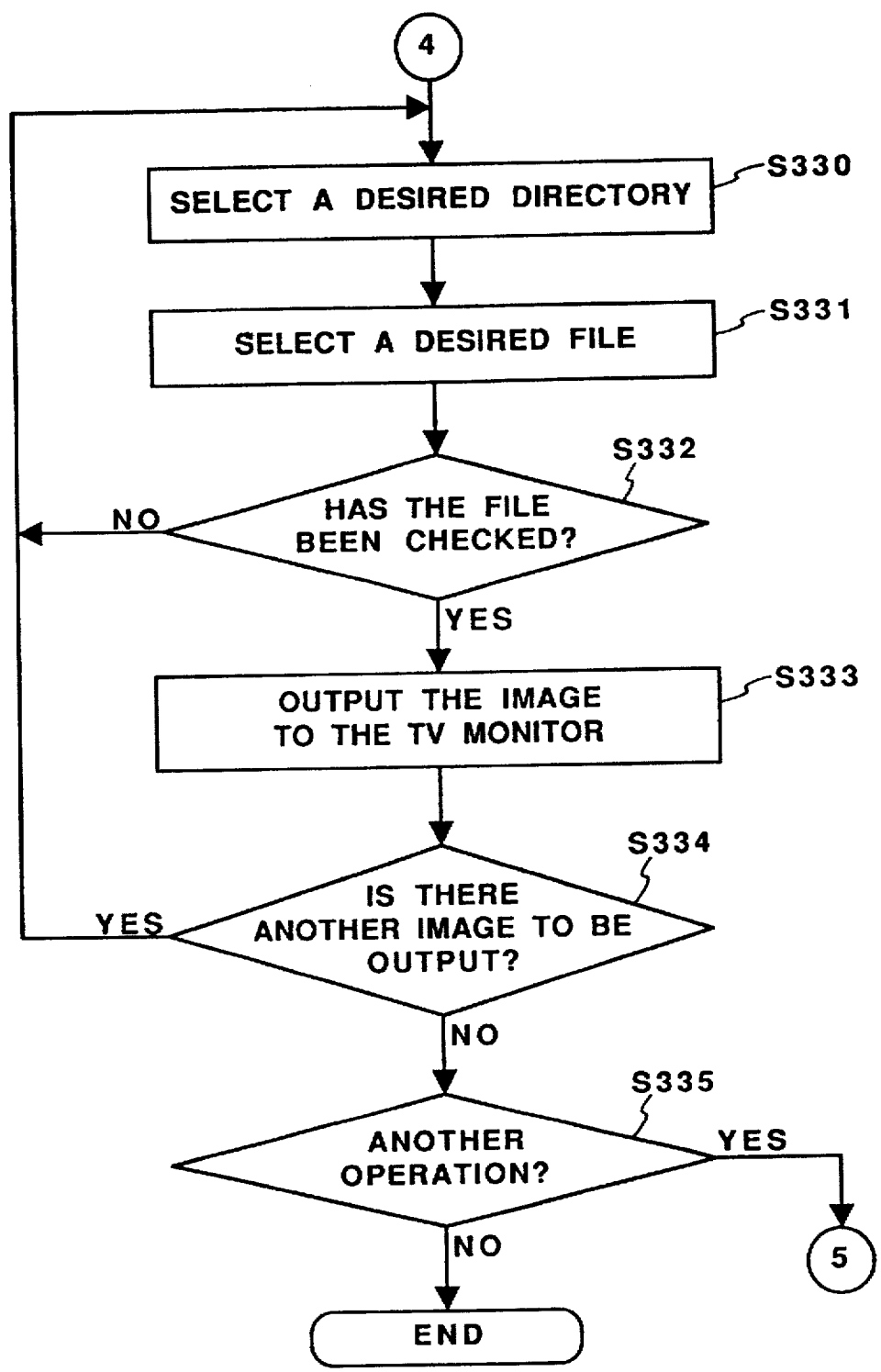

If it is determined in step S303 that output of an image is to be conducted, the output device is selected in step S306, that is, it is determined whether the image is reproduced as a facsimile image or the reproduced image is output to the TV monitor 306. In step S307, the contents of the selection are determined. If the facsimile image transmission is to be conducted, the process goes to step S321 (FIG. 25D). If the image is to be output to the TV monitor 306, the process goes to step S330 (FIG. 25E).

First, the operation of receiving a facsimile image will be described with reference to FIG. 25B.

Since this operation is suspended when an interrupt command is input, it is first determined in step S308 whether or not an interrupt has occurred. If an interrupt has occurred, the process goes to step S309, and it is determined whether or not another operation is to be performed. If there is another operation to be performed, the process returns to step S302. If there is no operation to be performed, the magneto-optical disk 307 is unloaded, thereby completing the operation.

If it is determined in step S308 that no interrupt has occurred, the process goes to step S310 and reception is awaited. In this waiting state, execution of a loop consisting of steps S308 and S310 continues until a file is received or an interrupt occurs. When an incoming call arrives from a remote facsimile machine and facsimile communication starts in step 310, it is determined in step S311 whether the remote facsimile terminal is of the conventional facsimile apparatus or of the facsimile apparatus of this embodiment. That is, it is determined whether the image which will arrive is a binary mode image or color mode image. If the binary mode image is to arrive, the process goes to step S312, and the received image is stored as a binary mode file under the today's directory, e.g., under the "'90.9.9" directory indicated by reference character 142 if today is Sep. 9th, 1990, which is subordinate to the binary mode reception image directory 134. The today's directory is automatically created by the calender function. The name of the file to be recorded is automatically put by the facsimile apparatus. For example, the reception time provided by the clock function is used as the file name. After reception has been completed and recording of the binary mode file has thus been completed, the process goes to step S313 and the black and white image file 331 is created, as mentioned in connection with FIG. 21. The created file is recorded under the same file name under the "'90.9.9" directory (indicated by reference character 146) which is subordinate to the full-color image directory 136. After recording, the process returns to the loop consisting of steps S308 and S310 and reception is awaited.

If the image which will arrive is a color mode image, the process goes to step S314, and the received image is recorded as a color mode file under "'90.9.9" directory indicated by reference character 144 which is subordinate to the color mode reception image directory 135. At that time, the file name is automatically put in the same manner as that of the aforementioned case. After reception has been completed and recording of the color mode file has thus been completed, the full-color image file 331 is created in step S315, as mentioned in connection with FIG. 21. The created file is recorded under the same file name under the "'90.9.9" directory (indicated by reference character 146) which is subordinate to the full-color image directory 136. After recording, the process returns to the loop consisting of steps S308 and S310 and reception is awaited. When series of image data arrive in sequence (a plurality of pages are received), the received image data is stored as a single reception file.

Next, the operation of inputting an image from the video camera 305 will be described with reference to FIG. 25C.

First, the originator's name and the receiver's name are input from the operation panel 309 in step S316. The input data is used not only as the file name but also as the originator data which is to be added at the top of the facsimile image. Of course, the input data can be altered at the time of transmission.

Next, the image is read out from the video camera 305 and is stored as a full-color image file in the magneto-optical disk under the "'90.9.9" directory (indicated by reference character 146 in FIG. 14), today's date, which is subordinate to the full-color image directory 136. At that time, the name of the file is created using the originator's name and the receiver's name which have been input in step S316, e.g., "ABC Co., Ltd" as the originator name and "ABC Office" as the receiver's name.

After recording has been completed, the binary mode file 329 and the color mode file 330 are created in step S318, as described in connection with FIG. 21. The created binary mode file is recorded under the same file name under the directory "'90.9.9", today's date, indicated by reference character 138, which is subordinate to the binary mode transmission image directory 132. The created color mode file is recorded under the same file name under the directory "'90.9.9", today's date, indicated by reference character 140, which is subordinate to the color mode transmission image directory 133. Each of the files may consist of a plurality of files each of which represents one screen or a single file representing a plurality of pages of an image. After recording has been completed, it is determined in step S319 whether another file image is to be input. If there is another file to be input, the process returns to step S316. If there is no more file to be input, the process proceeds to step S320, and it is determined whether another operation is to be performed. If there is another operation to be performed, the process returns to step S302. If there is no more operation to be performed, the magneto-optical disk is unloaded, thereby completing the operation.

Next, the operation of facsimile image transmission will be described with reference to FIG. 25D.

When this operation is selected, the directory names which are subordinate to the binary mode transmission image directory 132 are read out and displayed on the display portion 310. In this embodiment, since the date is used as the directory name, "'90.9.8" (indicated by reference character 137), "'90.9.9" (indicated by reference character 138), . . . , shown in FIG. 14, are displayed. In step S321, the directory under which the desired image file is stored is selected. When the single directory has been selected, the names of the files stored under the selected directory are displayed on the display portion 310. In this embodiment, since originator's names and receiver's names are used as the file names, "1 ABC Co., Ltd. to ABC Office)". . . are displayed.

In step S322, the desired file name is selected. When the file name has been selected, part of the first page or demagnified image of that image file (binary mode) is displayed on the display portion 310. If the display portion 310 is capable of full-color display, the first page of the same file name under the same directory under the full-color image directory 136 may be displayed. The operator makes a determination as to whether the file selected in step S322 is a desired one, and gives the instruction in step S323. If the displayed image is not the one the operator desired, the process returns to step S321 and the same operations are repeated.

If the displayed image is the one that the operator desired, the process goes to step S324, and the telephone number of the receiver is input. At that time, the originator's name and the receiver's name which are used as the originator's data may be altered. After the input data is displayed on the display unit 310 and is checked by the operator, the telephone number is called to connect the remote facsimile machine to the telephone line. When the telephone line has been connected, the receivable mode of the destination facsimile apparatus is checked in step S325.

If the destination facsimile apparatus is capable of receiving the color mode file 327, the same file name as the selected one under the same directory as the selected one which is subordinate to the color mode transmission image directory 133 is transmitted in step S326. If color mode transmission is impossible, the binary mode file is reproduced and transmitted in step S327. Even if color mode transmission is possible, when binary mode transmission is to be performed depending on the type of the original document image, binary mode transmission is performed.

When transmission has been completed, the process goes to step S328, and it is determined whether or not there is another file to be transmitted. If there is another file to be transmitted, the process returns to step S321. If there is no more file to be transmitted, the process goes to step S329, and it is determined whether or not there is another operation to be performed. If there is another operation to be performed, the process returns to step S302. If there is no more operation to be performed, the magneto-optical disk 307 is unloaded, thereby completing the operation.

Next, the operation of outputting an image to the TV monitor 306 will be described with reference to FIG. 25E.

When this operation has been selected, the directory names which are subordinate to the full-color image directory 136 in the magneto-optical disk 307, for example, "'90.9.8" (indicated by 145) "'90.9.9" (indicated by 146), are read out and displayed on the display portion 310. When a single directory has been selected in step S330, the file names stored under the selected directory are displayed on the display portion 310. When the displayed files are those input from the video camera 305, the displayed file names are those which are input from the operation panel 309, like "1. ABC Co., Ltd. to ABC Office". The number of pixels per screen of such files is 640×500. When the displayed files are those which are received as the facsimile images, the file names thereof are reception times. If the files are those converted from the binary mode files, the number of pixels per screen is 580×770. When the files are those converted from the color mode files, the number of pixels per screen is 640×500.

In step S331, the operator selects the desired image file name from the operation panel 309. When the desired file name has been selected, the first page of that file is reproduced and is stored in the flame memory 315 in the same manner as that of step S323. The reproduced file is converted into a video signal according to the number of pixels, and the converted the video signal is output to the TV monitor 306. In step S332, it is determined whether or not the operator has made the confirmation indicating that the displayed image is the designated one. When the operator inputs the confirmation from the operation panel 309, subsequent pages of the image are reproduced by pressing of, for example, page feed buttons, in step S333, to display the image on the TV monitor 306. If the operator determines that the displayed image is not the desired one, the process returns to step S331 and the same operations are repeated.

After the output has been completed, it is determined in step S334 whether or not there is another file to be output. If there is another file to be output, the process returns to step S330. If there is no more file to be output, the process goes to step S335, and it is determined whether or not there is another operation to be performed. If there is another operation to be performed, the process returns to step S302. If there is no more operation to be performed, the magneto-optical disk is unloaded, thereby completing the operation.

In the third embodiment, a full-color image is transmitted in the form of a pseudo conventional facsimile signal which is obtained by dividing each of the R, G and B components by bit and then by adding dummy data to each data. Also, an original full-color image is restored from a plurality of received pages (in this case, 3×8=24 pages). However, an aural signal can also be transmitted and received in the form of a pseudo signal. That is, since the facsimile apparatus according to the present embodiment is capable of transmitting image signals input from the video camera and of displaying the received images on the TV monitor, input and output of voices are also possible.

Furthermore, in this embodiment, a color mode file is obtained by converting a full color image after it has been magnified by 3. However, it may also be obtained in the manner described below: the full-color image is divided into R, G, and B without enlargement and each of the R, G and B components is further divided into 8 images by bit to obtain 24 images. The obtained images are connected to each other for each R, G or B component, and dummy data is added to each of the resultant 3 images to provide pseudo binary mode files. In this way, since the full-color image can be expressed by three pseudo binary mode images, the required capacity can be saved.

Furthermore, in the third embodiment, a video signal is input to the facsimile apparatus from the video camera. However, an image signal stored in, for example, a video recorder, may be input.

The present invention can be applied to either a system made up of a plurality of units or an apparatus consisting of a single unit. The present invention can also be applied to the system or apparatus which is operated when programs are supplied thereto.

As will be understood from the foregoing description, in the third embodiment, a portable storage medium is provided. When an image is to be transmitted, the image input from a video camera is stored temporarily in the storage medium. File conversion is conducted on the stored image, and the converted file is sent to the telephone line in the same manner as that of a conventional facsimile signal.

When an image is to be received, the conventional facsimile signal received from the telephone line is stored in the storage medium. File conversion is conducted on the stored image and the converted image is output to the TV monitor. Consequently, transmission and reception of facsimile images can be performed without using the recording paper.

Since the transmitted/received image data can be kept stored in the storage medium, recording and storage of a lot of facsimile images do not require storage space.

As mentioned above, in the third embodiment, since an input video signal can be transmitted via a communication line while an image signal received via the communication line can be displayed on a monitor, the images which are to be transmitted and the received images can be input and output without using the recording paper.

The present invention is not limited to the above embodiments and various changes and modifications can be made within the spirit and scope of the present invention. Therefore, to apprise the public of the scope of the present invention the following claims are made.

What is claimed is:

1. An image processing apparatus comprising:
   input means for inputting image data as common image data;
   first generating means for generating first image data based on the common image data, the first image data having a first plural number of tones;
   second generating means for generating second image data based on the common image data, the second image data having a second plural number of tones smaller than the first number of tones;
   a common memory for storing both the first image data and the second image data; and
   selection means for selecting one of the first and second image data stored in said common memory as selected image data and outputting the selected image data.

2. The image processing apparatus according to claim 1, wherein the first image data is color image data, and the second image data is monochrome image data.

3. The image processing apparatus according to claim 1, wherein said selection means outputs the selected image data via a communication line.

4. An image processing apparatus comprising:
   input means for inputting image data as common image data;
   first generating means for generating first image data based on the common image data, the first image data having a first plural number of tones;
   second generating means for generating second image data based on the common image data, the second image data having a second plural number of tones smaller than the first number of tones;
   a common memory for storing both the first image data and the second image data; and selection means for selecting one of the first and second image data stored in said common memory as selected image data and outputting the selected image data, wherein said selection means selects image data in accordance with an output destination apparatus.

5. An image processing method comprising the steps of:

inputting image data as common image data;

generating first image data based on the common image data, the first image data having a first plural number of tones;

generating second image data based on the common image data, the second image data having a second plural number of tones smaller than the first number of tones;

storing both the first image data and the second image data in a common memory;

selecting one of the first and second image data stored in the common memory as selected image data; and outputting the selected image data.

6. An image processing apparatus comprising:

input means for inputting image data as common image data;

first generating means for generating first image data based on the common image data, the first image data having a first plural number of tones;

second generating means for generating second image data based on the common image data, the second image data having a second plural number of tones smaller than the first number of tones;

a common memory for storing both the first image data and the second image data, said common memory being removable from said apparatus; and selection means for selecting one of the first and second image data stored in said common memory as selected image data and outputting the selected image data, wherein said selection means selects image data in accordance with an output destination apparatus.

7. The image processing apparatus according to claim 6, wherein said selection means outputs the selected image data via a communication line.

8. An image processing apparatus comprising:

input means for inputting image data as common image data;

first generating means for generating first image data based on the common image data, the first image data having a first plural number of tones;

second generating means for generating second image data based on the common image data, the second image data having a second plural number of tones smaller than the first number of tones;

a common memory for storing both the first image data and the second image data, said common memory being removable from said apparatus; and selection means for selecting one of the first and second image data stored in said common memory as selected image data and outputting the selected image data, wherein the first image data is color image data, and the second image data is monochrome image data.

9. The image processing apparatus according to claim 8, wherein said selection means outputs the selected image data via a communication line.

10. An image processing apparatus comprising:

input means for inputting color image data as base color image data;

conversion means for converting the base color image data into monochrome image data;

a common memory for storing both the base color image data and the monochrome image data; and selection means for selecting one of the base color image data and the monochrome image data stored in said common memory as selected image data and outputting the selected image data.

11. The image processing apparatus according to claim 10, wherein said selection means selects image data in accordance with an output destination apparatus.

12. The image processing apparatus according to claim 10, wherein the base color image data is multi-level image data, and the monochrome image data is binary image data.

13. The image processing apparatus according to claim 10, wherein said selection means outputs the selected image data via a communication line.

14. An image processing method comprising the steps of:

inputting color image data as base color image data;

converting the base color image data into monochrome image data;

storing both the base color image data and the monochrome image data into a common memory;

selecting one of the base color image data and the monochrome image data stored in the common memory as selected image data; and outputting the selected image data.

15. An image processing apparatus comprising:

input means for inputting color image data as base color image data image data;

conversion means for converting the base color image data into monochrome image data;

a common memory for storing both the base color image data and the monochrome image data, said common memory being removable from said apparatus; and selection means for selecting one of the base color image data and the monochrome image data stored in said common memory as selected image data and outputting the selected image data.

16. The image processing apparatus according to claim 15, wherein said selection means selects image data in accordance with an output destination apparatus.

17. The image processing apparatus according to claim 15, wherein the base color image data is multi-level image data, and the monochrome image data is binary image data.

18. The image processing apparatus according to claim 15, wherein said selection means outputs the selected image data via a communication line.

19. An image processing method operative in an image processing apparatus, said method comprising the steps of:

inputting color image data as base color image data;

converting the base color image data into monochrome image data;

storing both the base color image data and the monochrome image data into a common memory, the common memory being removable from the apparatus;

selecting one of the base color image data and the monochrome image data stored in the common memory as selected image data; and outputting the selected image data.

* * * * *

UNITED STATES PATENT AND TRADEMARK OFFICE
CERTIFICATE OF CORRECTION

PATENT NO. : 5,717,506

DATED : February 10, 1998

INVENTOR(S): MASAKUNI YAMAMOTO ET AL.

It is certified that error appears in the above-identified patent and that said Letters Patent is hereby corrected as shown below:

TITLE PAGE, ITEM

[56] REFERENCES CITED

```
   U.S. Patent Documents
      Insert: --5,122,872  6/1992  Nagano    358,523--.
      Insert: --5,315,702  5/1994  Kusàkawâ  358,524--.
```

COLUMN 1

Line 18, "64" should read --65--.

COLUMN 30

Line 33, "image data" (second occurrence) should be deleted.

Signed and Sealed this

Twenty-ninth Day of September, 1998

Attest:

BRUCE LEHMAN

*Attesting Officer*   *Commissioner of Patents and Trademarks*